United States Patent
Isobe et al.

(10) Patent No.: US 11,298,814 B2
(45) Date of Patent: Apr. 12, 2022

(54) LINK ACTUATING DEVICE HAVING A PROXIMAL-END-SIDE LINK HUB, A DISTAL-END-SIDE LINK HUB, AND THREE OR MORE LINK MECHANISMS

(71) Applicant: NTN CORPORATION, Osaka (JP)

(72) Inventors: Hiroshi Isobe, Iwata (JP); Naoki Marui, Iwata (JP); Seigo Sakata, Iwata (JP); Kenzou Nose, Iwata (JP)

(73) Assignee: NTN CORPORATION, Osaka (JP)

( * ) Notice: Subject to any disclaimer, the term of this patent is extended or adjusted under 35 U.S.C. 154(b) by 116 days.

(21) Appl. No.: 16/814,144

(22) Filed: Mar. 10, 2020

(65) Prior Publication Data

US 2020/0206897 A1    Jul. 2, 2020

Related U.S. Application Data

(63) Continuation of application No. PCT/JP2018/035505, filed on Sep. 25, 2018.

(30) Foreign Application Priority Data

Sep. 26, 2017  (JP) .............................. JP2017-185183

(51) Int. Cl.
  *B25J 9/00* (2006.01)
  *F16H 21/46* (2006.01)
  *B25J 9/16* (2006.01)

(52) U.S. Cl.
  CPC ............ *B25J 9/003* (2013.01); *B25J 9/0048* (2013.01); *B25J 9/1623* (2013.01); *F16H 21/46* (2013.01)

(58) Field of Classification Search
  CPC .............................. B25J 9/0048; B25J 9/1623
  See application file for complete search history.

(56) References Cited

U.S. PATENT DOCUMENTS 3,477,249 A  * 11/1969 Culver .................... F16D 3/30
                                                           464/106
5,893,296 A    4/1999 Rosheim
(Continued)

FOREIGN PATENT DOCUMENTS

EP        0987087       3/2000
JP     2000-094245      4/2000
(Continued)

OTHER PUBLICATIONS

International Search Report dated Dec. 4, 2018 In corresponding International Patent Application No. PCT/JP2018/035505.
(Continued)

*Primary Examiner* — Joseph Brown

(57) ABSTRACT

A link actuation device includes a proximal-end-side link hub, a distal-end-side link hub, three or more link mechanisms each coupling the link hubs such that a posture of the distal-end-side link hub can be changed relative to the proximal-end-side link hub. Each link mechanism includes a proximal-side end link member, a proximal-side intermediate link member, a distal-side intermediate link member, and a distal-side end link member. Actuators for arbitrarily changing the posture and a distance from the distal-end-side link hub to the proximal-end-side link hub are provided to three or more link mechanisms of the three or more link mechanisms. A control unit calculates a rotation angle of the proximal-side end link member according to a targeted posture of the distal-end-side link hub and a targeted distance between the centers of the spherical links, and controls the respective actuators so as to attain the calculated rotation angle.

6 Claims, 12 Drawing Sheets

(56) References Cited

U.S. PATENT DOCUMENTS

| | | | |
|---|---|---|---|
| 5,979,264 | A | 11/1999 | Rosheim |
| 6,105,455 | A | 8/2000 | Rosheim |
| 9,752,718 | B1* | 9/2017 | Wittig ................ F16M 11/2078 |
| 9,808,932 | B2 | 11/2017 | Nishio et al. |
| 2002/0166404 | A1 | 11/2002 | Rosheim |
| 2005/0159075 | A1* | 7/2005 | Isobe ..................... B25J 9/0048 446/104 |
| 2005/0199085 | A1* | 9/2005 | Isobe ..................... B25J 9/0048 74/490.05 |
| 2006/0213308 | A1* | 9/2006 | Rosheim ............... B25J 9/0048 74/490.01 |
| 2012/0043100 | A1* | 2/2012 | Isobe .................. B25J 17/0266 173/42 |
| 2013/0055843 | A1* | 3/2013 | Isobe ........................ F16C 1/02 74/490.04 |
| 2014/0223722 | A1* | 8/2014 | Isobe ..................... B25J 9/1623 29/428 |
| 2014/0224046 | A1* | 8/2014 | Isobe ..................... F16H 19/08 74/89.14 |
| 2014/0248965 | A1* | 9/2014 | Isobe ..................... F16C 19/46 464/112 |
| 2014/0305244 | A1* | 10/2014 | Yamada ............... B25J 19/0066 74/479.01 |
| 2015/0088308 | A1* | 3/2015 | Isobe ..................... B25J 13/087 700/245 |
| 2016/0008977 | A1 | 1/2016 | Nishio et al. |
| 2016/0059426 | A1* | 3/2016 | Sone ...................... B25J 9/0048 74/490.05 |
| 2016/0256998 | A1* | 9/2016 | Isobe .................. B05B 13/0431 |
| 2016/0361816 | A1* | 12/2016 | Sakata .................... F16H 21/46 |
| 2017/0014994 | A1* | 1/2017 | Isobe ..................... B25J 9/0009 |
| 2017/0268640 | A1* | 9/2017 | Sakata ..................... B25J 13/06 |
| 2021/0086350 | A1* | 3/2021 | Nose ........................ B25J 9/106 |

FOREIGN PATENT DOCUMENTS

| | | |
|---|---|---|
| JP | 2001-520941 | 11/2001 |
| JP | 2015-25530 | 2/2015 |
| JP | 2016-50640 | 4/2016 |
| JP | 2018-167365 | 11/2018 |
| WO | WO 99/21070 | 4/1999 |

OTHER PUBLICATIONS

Office action dated Feb. 26, 2019, in corresponding Japanese Patent Application No. 2017-185183.

International Preliminary Report on Patentability dated Mar. 31, 2020, in corresponding International Patent Application No. PCT/JP2018/035505 (5 pages).

* cited by examiner

LINK ACTUATING DEVICE HAVING A PROXIMAL-END-SIDE LINK HUB, A DISTAL-END-SIDE LINK HUB, AND THREE OR MORE LINK MECHANISMS

CROSS REFERENCE TO THE RELATED APPLICATION

This application is a continuation application, under 35 U.S.C. $\S$ 111(a) of international patent application No. PCT/JP2018/035505, filed Sep. 25, 2018, which claims priority to Japanese patent application No. 2017-185183, filed Sep. 26, 2017, the entire disclosure of which is herein incorporated by reference as a part of this application.

BACKGROUND OF THE INVENTION

Field of the Invention

The present invention relates to a link actuation device, such as a medical apparatus and an industrial apparatus, that requires a precise and wide operating range.

Description of Related Art

Patent Document 1 discloses an example of a work device having a parallel link mechanism. Patent Documents 2, 3 disclose examples of a link actuation device used in, e.g., a medical apparatus or an industrial apparatus.

RELATED DOCUMENT

Patent Document

[Patent Document 1] JP Laid-open Patent Publication No. 2000-094245
[Patent Document 2] U.S. Pat. No. 5,893,296
[Patent Document 3] U.S. Pat. No. 5,979,264
[Patent Document 4] JP Laid-open Patent Publication No. 2015-025530

In a parallel link mechanism of Patent Document 1, since each link has a small operation angle, it is necessary to increase a link length in order to provide a large operation range for a travelling plate. This increases dimensions of the mechanism as a whole, causing a problem that the device has an increased size. Also, an increase in the link length may result in decrease in rigidity of the mechanism as a whole. Therefore, there is a problem that a weight of a tool to be mounted on the travelling plate, i.e., a load capacity of the travelling plate, is restricted to a small value. For these reasons, it is difficult to use such a parallel link mechanism in a medical apparatus or the like that is required to have a compact configuration and to perform a precise operation over a wide operating range.

A link actuation device of Patent Document 2 includes three or more quadric-chain link mechanisms, achieving a compact configuration as well as precise operation over a wide operating range. However, although this link actuation device is configured to control a rotation position of an end link member, the device has a structural problem that the rotation center is moved because a distal-end-side link hub has a different rotation radius according to a bend angle.

Patent Document 3 suggests that a revolute pair is provided with intermediate link members in the configuration of Patent Document 2 so that a distance between centers of proximal-end-side and distal-end-side spherical links can be extended/reduced. Patent 3, however, does not describe how much the distance between the centers of the spherical links can be extended/reduced or how a rotation radius of a work point can be controlled to an arbitrary value.

The applicants of the present invention have suggested a method of controlling a bend angle and/or a turning angle of a link actuation device in Patent Document 4 listed above. Patent Document 4, however, does not disclose a configuration that allows a distance between centers of proximal-end-side and distal-end-side spherical links to be extended/reduced, or a method of controlling an amount by which the distance can be extended/reduced or a rotation radius of a work point to an arbitrary value.

SUMMARY OF THE INVENTION

An object of the present invention is to provide a link actuation device that has a compact configuration and is capable of operating over a wide operating range, arbitrarily changing a distance between the centers of spherical links, and controlling such a change operation.

A link actuation device of the present invention includes: a proximal-end-side link hub; a distal-end-side link hub; three or more link mechanisms each coupling the distal-end-side link hub to the proximal-end-side link hub such that a posture of the distal-end-side link hub can be changed relative to the proximal-end-side link hub. Each of the link mechanisms includes: a proximal-side end link member having one end rotatably coupled to the proximal-end-side link hub; a distal-side end link member having one end rotatably coupled to the distal-end-side link hub; a proximal-side intermediate link member having one end rotatably coupled to the other end of the proximal-side end link member; and a distal-side intermediate link member having one end rotatably coupled to the other end of the distal-side end link member, the other ends of the proximal-side and distal-side intermediate link members being rotatably coupled to each other.

A central axis of a revolute pair of the proximal-side end link member and the proximal-side intermediate link member intersect with a central axis of a revolute pair of the distal-side end link member and the distal-side intermediate link member at a single point, the other ends of the proximal-side and distal-side intermediate link members being rotatably coupled to each other at a rotation axis of the intermediate link members that is a central axis of a revolute pair of the proximal-side and distal-side intermediate link members so that an angle formed by the central axes of these revolute pairs can be changed.

For each of the link mechanisms, a geometric model that represents the link mechanism with straight lines has such a shape that a proximal side part and a distal side part are symmetrical to each other with respect to the rotation axis of the intermediate link members.

Actuators are provided to three or more link mechanisms of the three or more link mechanisms and configured to arbitrarily change the posture and a distance from the distal-end-side link hub to the proximal-end-side link hub; and A control unit is configured to control the actuators.

In each of the proximal side part and the distal side part, a point at which the central axis of each revolute pair of the link hub and the end link member intersects with the central axis of each revolute pair of the end link member and the intermediate link member is referred to as a center of each spherical link, and a line that passes through the center of the spherical link and orthogonally intersects with the central axis of each revolute pair of the link hub and the end link member is referred to as a central axis of the link hub.

In a link actuation device according to a first invention of the present invention having the above basic configuration, the control unit is configured to calculate a rotation angle βn of the proximal-side end link member from a targeted posture (θ, φ) of the distal-end-side link hub relative to the proximal-end-side link hub and a targeted distance D between the centers of the spherical links by inversely converting equation 1 below, such that the relationships represented by the following equations are satisfied, and control the respective actuators so as to attain a calculated rotation angle βn:

where each of the proximal side part and the distal side part has: an axial angle α formed by the central axis of the revolute pair of the end link member and the intermediate link member and the central axis of the revolute pair of the link hub and the end link member; a distance La from a projection line obtained by vertically projecting the rotation axis of the intermediate link members onto a plane including the central axis of the revolute pair of the end link member and the intermediate link member and the central axis of the revolute pair of the link hub and the end link member, to the center of the spherical link; a distance Lb from the projection line to the rotation axis of the intermediate link members, the proximal-side end link member has the rotation angle βn (n=1, 2, 3, . . . ) relative to the proximal-end-side link hub; a central axis of the distal-end-side link hub is inclined at a vertical angle θ relative a central axis of the proximal-end-side link hub; the central axis of the distal-end-side link hub is inclined at a horizontal angle φ relative to the central axis of the proximal-end-side link hub; the center of the proximal-end-side spherical link has a distance D from the center of the distal-end-side spherical link; the central axis of the revolute pair of the proximal-side end link member and the proximal-side intermediate link member forms an angle γ relative to the central axis of the revolute pair of the distal-side end link member and the distal-side intermediate link member; each of the proximal-side end link members is separated at a separation angle δn (n=1, 2, 3, . . . ) in a circumferential direction with respect to the proximal-side end link member of the respective proximal-side end link members which serves as a reference; each of the projection lines on a proximal side is separated at a separation angle εn (n=1, 2, 3, . . . ) in the circumferential direction with respect to a reference phase on a circumference through which the projection lines on the proximal side pass; the projection line on the proximal side that serves as a reference has a separation angle ε0 in a state where the posture of the distal-end-side link hub relative to the proximal-end-side link hub is at an origin position (θ=0, φ=0).

[Math 1]

$$\begin{pmatrix} \cos(\gamma/2)\cos\varepsilon 0 \\ \pm\sin\alpha\cos\beta n \\ \sin\alpha\sin\beta n \end{pmatrix} = $$

$$\begin{pmatrix} \cos(\phi-\delta n) & -\sin(\phi-\delta n) & 0 \\ \sin(\phi-\delta n) & \cos(\phi-\delta n) & 0 \\ 0 & 0 & 1 \end{pmatrix} \begin{pmatrix} \cos(\theta/2) & 0 & \sin(\theta/2) \\ 0 & 1 & 0 \\ -\sin(\theta/2) & 0 & \cos(\theta/2) \end{pmatrix}$$

$$\begin{pmatrix} \cos(\phi-\delta n) & \sin(\phi-\delta n) & 0 \\ -\sin(\phi-\delta n) & \cos(\phi-\delta n) & 0 \\ 0 & 0 & 1 \end{pmatrix} \begin{pmatrix} \cos(\gamma/2)\cos\varepsilon n \\ \cos(\gamma/2)\sin\varepsilon n \\ \sin(\gamma/2) \end{pmatrix}$$

equation 1

-continued $$\frac{\gamma}{2} = \sin^{-1}\left(\frac{D}{2\sqrt{La^2+Lb^2}}\right) - \tan^{-1}\left(\frac{Lb}{La}\right)$$

equation 2

$$\varepsilon_0 = \pm\sin^{-1}\left(\sqrt{\frac{\sin^2\alpha - \sin^2(\gamma/2)}{\cos^2(\gamma/2)}}\right)$$

equation 3

According to this configuration, the proximal-end-side link hub, the distal-end-side link hub, and the three or more link mechanisms cooperate together to form a parallel link mechanism having three degrees of freedom that allows the distal-end-side link hub to be rotatably moved relative to the proximal-end-side link hub in two orthogonal axial directions and a distance therebetween to be varied. The parallel link mechanism can have a configuration that is compact and provides a wide operating range for the distal-end-side link hub. Provision of the actuators to three or more link mechanisms of the three or more link mechanisms makes it possible to control the rotation angle βn of the respective proximal-side end link members to an arbitrary angle so as to define the operation of the link actuation device. That is, it is possible to attain the posture (θ, φ) of the distal-end-side link hub relative to the proximal-end-side link hub as well as the distance D between the centers of the spherical links. The angle γ formed by the central axis of the revolute pair of the proximal-side end link member and the proximal-side intermediate link member and the central axis of the revolute pair of the distal-side end link member and the distal-side intermediate link member is determined by the distance D between the centers of the spherical links.

Specifically, when the targeted posture (θ, φ) of the distal-end-side link hub and the targeted distance D between the centers of the spherical links are provided or obtained, the rotation angle βn of the proximal-side end link member can be calculated by reverse conversion of equation 1. The respective actuators are controlled to attain the calculated rotation angle βn such that the targeted posture (θ, φ) of the distal-end-side link hub and the targeted distance D between the centers of the spherical links are attained.

In a link actuation device according to a second invention of the present invention having the above basic configuration, the link actuation device includes a posture calculator configured to calculate a current posture (θ, φ) of the distal-end-side link hub relative to the proximal-end-side link hub as well as the current distance D between the centers of the spherical links from a rotation angle βn of the proximal-side end link member, by converting equation 1 of the following equations, where each of the proximal side part and the distal side part has: an axial angle α formed by the central axis of the revolute pair of the end link member and the intermediate link member and the central axis of the revolute pair of the link hub and the end link member; a distance La from a projection line obtained by vertically projecting the rotation axis of the intermediate link members onto a plane including the central axis of the revolute pair of the end link member and the intermediate link member and the central axis of the revolute pair of the link hub and the end link member, to the center of the spherical link; a distance Lb from the projection line to the rotation axis of the intermediate link members;

the proximal-side end link member has the rotation angle βn (n=1, 2, 3, . . . ) relative to the proximal-end-side link hub; a central axis of the distal-end-side link hub is inclined at a vertical angle θ relative to a central axis of the proximal-end-side link hub; the central axis of the distalend-side link hub is inclined at a horizontal angle φ relative to the central axis of the proximal-end-side link hub; the center of the proximal-end-side spherical link has a distance D from the center of the distal-end-side spherical link; the central axis of the revolute pair of the proximal-side end link member and the proximal-side intermediate link member forms an angle α relative to the central axis of the revolute pair of the distal-side end link member and the distal-side intermediate link member; each of the proximal-side end link members is separated at a separation angle δn (n=1, 2, 3, . . . ) in the circumferential direction with respect to the proximal-side end link member of the respective proximal-side end link members which serves as a reference; each of the projection lines on a proximal side is separated at a separation angle εn (n=1, 2, 3, . . . ) in the circumferential direction with respect to a reference phase on a circumference through which the projection lines on the proximal side pass; the projection line on the proximal side that serves as a reference has a separation angle ε0 in a state where the posture of the distal-end-side link hub relative to the proximal-end-side link hub is at an origin position (θ=0, φ=0).

[Math 2]

$$\begin{pmatrix} \cos(\gamma/2)\cos\varepsilon 0 \\ \pm\sin\alpha\cos\beta n \\ \sin\alpha\sin\beta n \end{pmatrix} =$$

$$\begin{pmatrix} \cos(\phi-\delta n) & -\sin(\phi-\delta n) & 0 \\ \sin(\phi-\delta n) & \cos(\phi-\delta n) & 0 \\ 0 & 0 & 1 \end{pmatrix} \begin{pmatrix} \cos(\theta/2) & 0 & \sin(\theta/2) \\ 0 & 1 & 0 \\ -\sin(\theta/2) & 0 & \cos(\theta/2) \end{pmatrix}$$

$$\begin{pmatrix} \cos(\phi-\delta n) & \sin(\phi-\delta n) & 0 \\ -\sin(\phi-\delta n) & \cos(\phi-\delta n) & 0 \\ 0 & 0 & 1 \end{pmatrix} \begin{pmatrix} \cos(\gamma/2)\cos\varepsilon n \\ \cos(\gamma/2)\sin\varepsilon n \\ \sin(\gamma/2) \end{pmatrix}$$

equation 1

$$\frac{\gamma}{2} = \sin^{-1}\left(\frac{D}{2\sqrt{La^2+Lb^2}}\right) - \tan^{-1}\left(\frac{Lb}{La}\right) \quad \text{equation 2}$$

$$\varepsilon_0 = \pm\sin^{-1}\left(\sqrt{\frac{\sin^2\alpha-\sin^2(\gamma/2)}{\cos^2(\gamma/2)}}\right) \quad \text{equation 3}$$

This configuration makes it possible to, in addition to the effects and advantages of the first invention, calculate the posture (θ, φ) of the distal-end-side link hub relative to the proximal-end-side link hub as well as the distance D between the centers of the spherical links in accordance with the rotation angle βn of the proximal-side end link member, thanks to the posture calculator. Specifically, the posture calculator substitutes the current rotation angle βn of the proximal-side end link member into equation 1 and converts the equation to calculate the current posture (θ, φ) of the distal-end-side link hub relative to the proximal-end-side link hub as well as the current distance D between the centers of the spherical links.

In the present invention, the control unit may be configured:
to calculate the distance D between the centers of the spherical links when the rotation radius R is at a target value, using the following equation; and $$D=2(R-Lc) \cos (\theta/2) \quad \text{equation 4}$$

to calculate the rotation angle βn of the proximal-side end link member from the targeted posture (θ, φ) of the distal-end-side link hub and the rotation radius R, and control the respective actuators so as to attain the calculated rotation angle βn, where a rotation radius from a rotation center that is an intersection of the central axis of the proximal-end-side link hub and the central axis of the distal-end-side link hub to a work point that is located at a fixed position relative to the distal-end-side link hub is defined as R, and a distance from the center of the distal-end-side spherical link to the work point is defined as Lc.

The above-described equation 4 holds because of the properties of the parallel link mechanism. Use of this equation makes it easy to calculate the distance D between the centers of the spherical links when the rotation radius R of the work point is at a target value. Thus, it is possible to control the respective actuators so that the rotation radius R of the work point attains an arbitrary value.

The control unit may be configured to calculate the posture (θ, φ) of the distal-end-side link hub and the distance D between the centers of the spherical links such that the rotation radius R of the work point remains constant and to control the respective actuators so as to attain the calculated rotation angle βn. Where the rotation radius R of the work point remains constant, the work point of the distal-end-side link hub moves on the surface of a sphere. That is, the motion of the distal-end-side link hub is limited to the motion directed in tangential directions of the sphere, and the rotation center of the distal-end-side link hub is not moved. Therefore, the conversion of coordinates for calculating a position of the work point can be simplified.

In the present invention, there may be a retreating function for reducing the distance between the centers of the spherical links to avoid contact with a peripheral object. There may also be a function for reducing the distance between the centers of the spherical links when the link actuation device is not in use.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

The present invention will be more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views:

DESCRIPTION OF THE EMBODIMENTS

Figure 1:
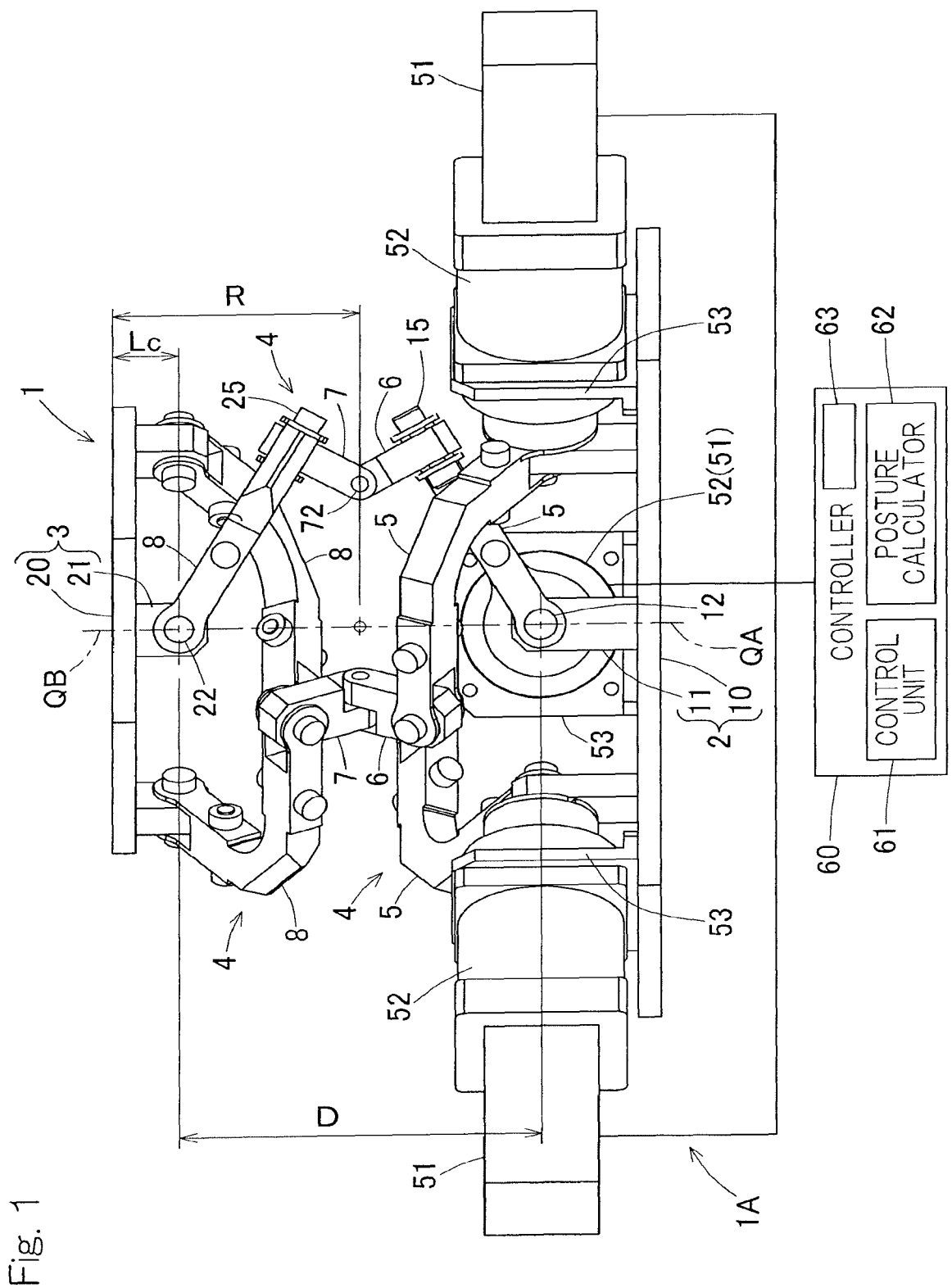
FIG. 1 shows a front view illustrating a state of a link actuation device according to one embodiment of the present invention, in combination with a block diagram of a control system.

Hereinafter, embodiments of the present invention will be described with reference to the drawings.

FIG. 1 to FIG. 4 are front views of a link actuation device according to an embodiment of the present invention, each illustrating a different operation state. It should be noted that FIG. 1 also includes a block diagram of a control system.

The link actuation device includes: a link-actuation-device mechanism part 1A including a parallel link mechanism 1 and a plurality of actuators 51 configured to operate the parallel link mechanism 1; and a controller 60 (FIG. 1) configured to operate the link-actuation-device mechanism part 1A. The controller 60 includes a control unit 61 and a posture calculator 62 as described later.

Parallel Link Mechanism

The parallel link mechanism 1 includes a proximal-end-side link hub 2, a distal-end-side link hub 3, and three link mechanism 4 each coupling the distal-end-side link hub 3 to the proximal-end-side link hub 2 such that a posture of the distal-end-side link hub 3 can be changed relative to the proximal-end-side link hub 2. There may be four or more link mechanisms 4.

Each of the link mechanisms 4 includes a proximal-side end link member 5, a proximal-side intermediate link member 6, a distal-side intermediate link member 7, and a distal-side end link member 8 and forms a quintuple-chain link mechanism having five revolute pairs. Each of the proximal-side and distal-side end link members 5, 8 has an L-shape. The proximal-side end link member 5 has one end rotatably coupled to the proximal-end-side link hub 2, and the distal-side end link member 8 has one end rotatably coupled to the distal-end-side link hub 3. The other end of the proximal-side end link member 5 is rotatably coupled to an end of the proximal-side intermediate link member 6, and the other end of the distal-side end link member 8 is rotatably coupled to an end of the distal-side intermediate link member 7. The proximal-side and distal-side intermediate link members 6, 7 are rotatably coupled to each other at the other ends thereof.

Figure 5:
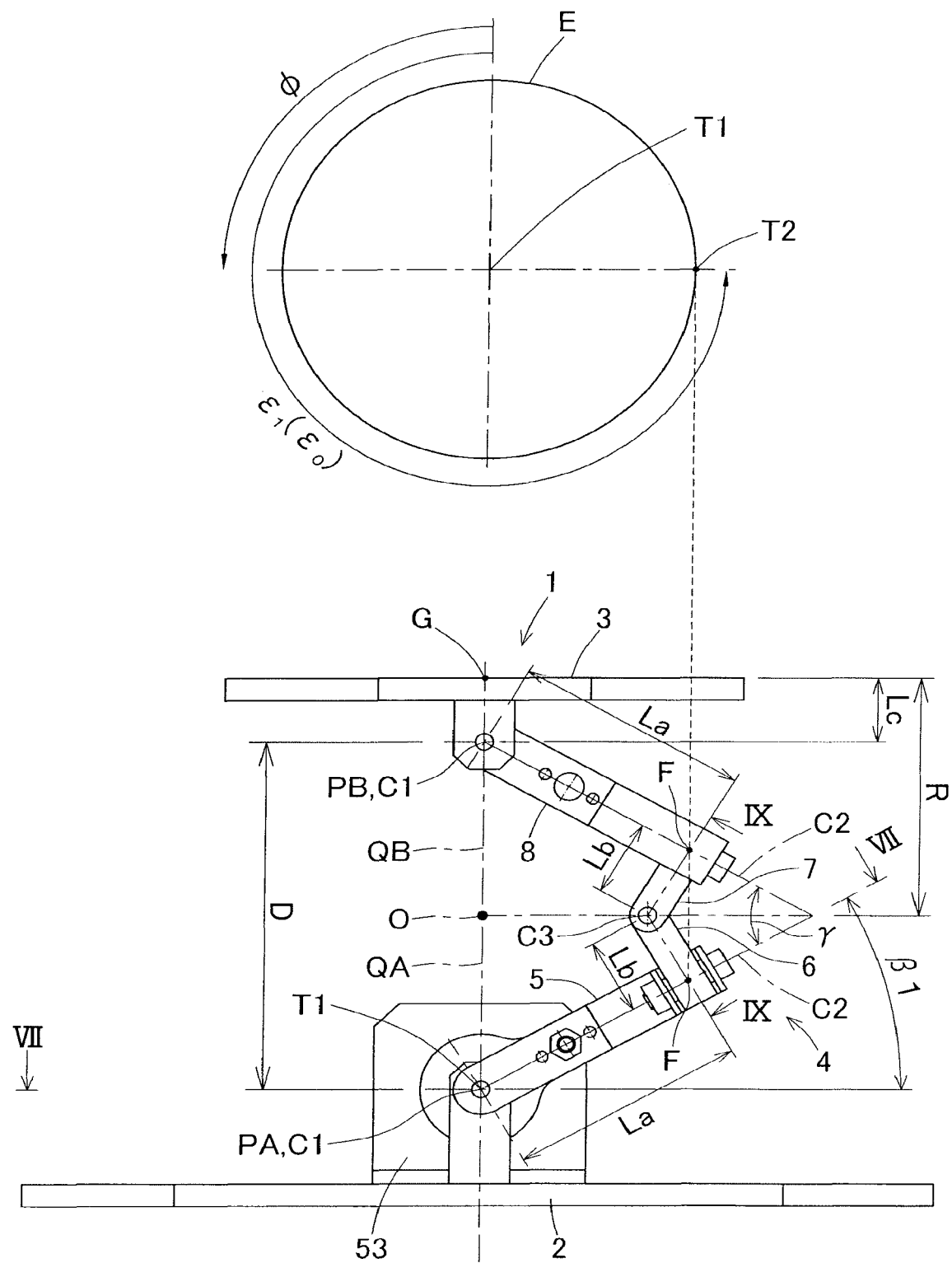
FIG. 5 is a front view illustrating a state of the link actuation device with a part of the device omitted, in combination with a diagram illustrating different angles in a circumferential direction.
Figure 6:
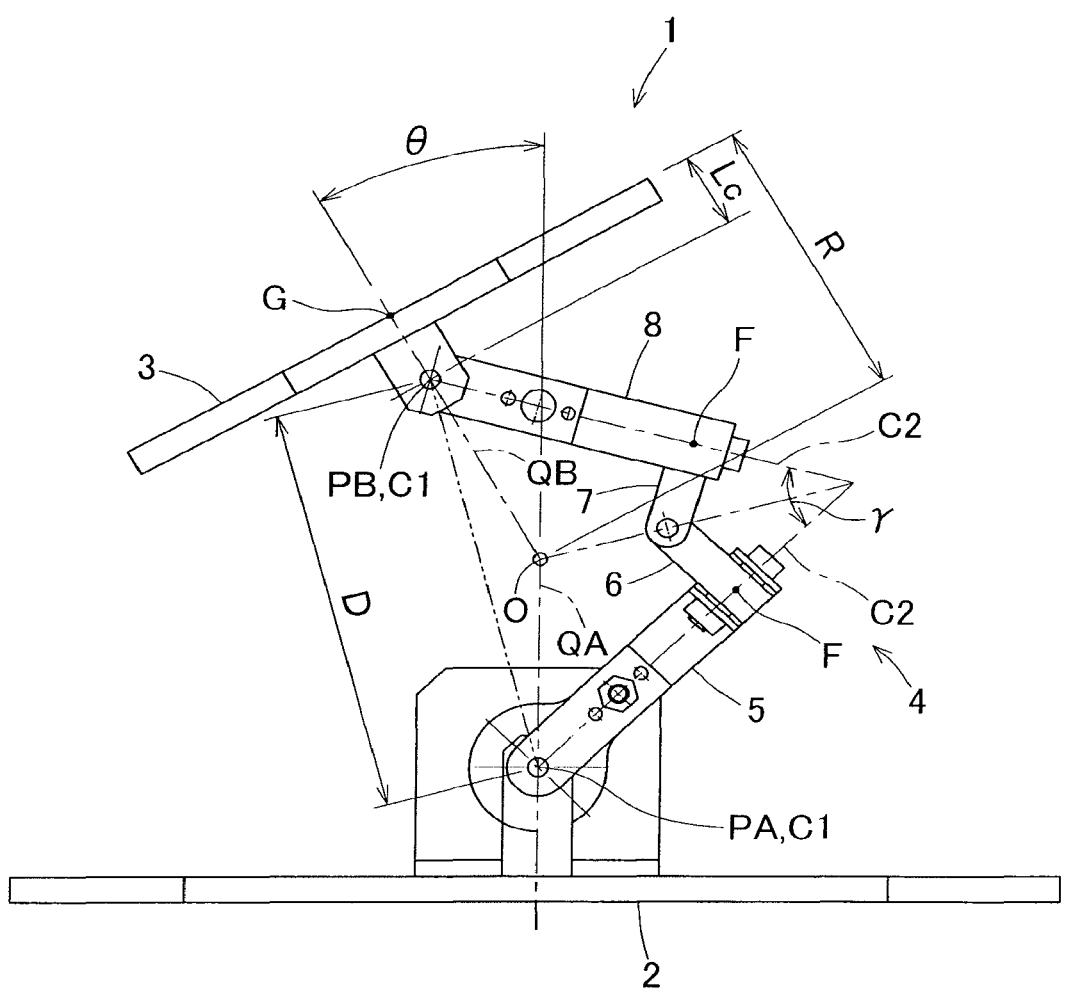
FIG. 6 is a front view illustrating another state of the link actuation device with a part of the device omitted.
Figure 7:
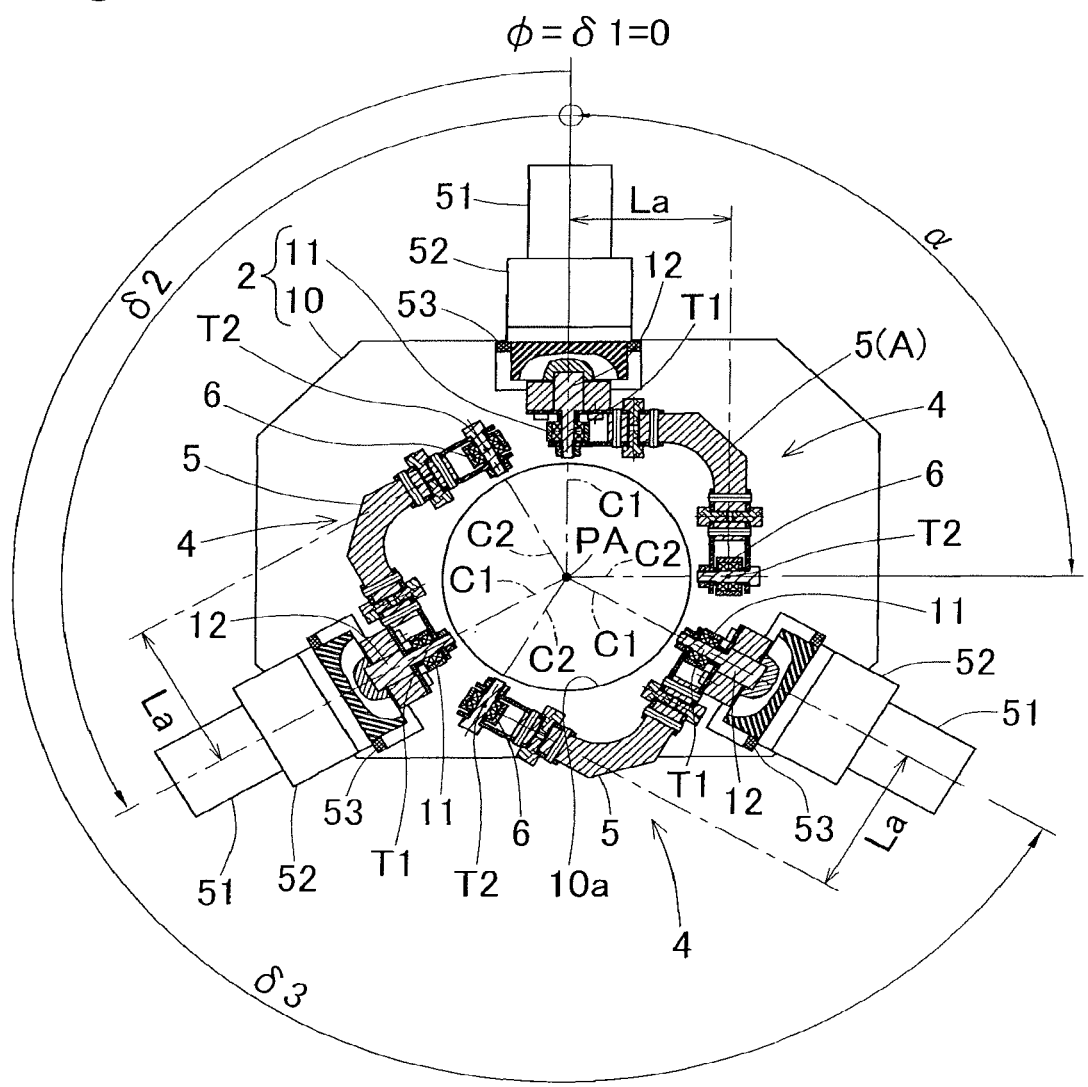
FIG. 7 is a sectional view along line VII-C1-VII in FIG. 5.

FIG. 5 is a front view illustrating a state of the link actuation device with a part of the device omitted. FIG. 6 is a front view illustrating another state of the same link actuation device. FIG. 5 and FIG. 6 show one of the three link mechanisms 4. FIG. 7 is a sectional view along line VII-C1-VII in FIG. 5 with illustration of different angles in a circumferential direction.

In FIG. 5 and FIG. 6, the parallel link mechanism 1 has a structure in which two spherical link mechanisms are combined. The central axis C1 of each revolute pair of the proximal-end-side link hub 2 and the proximal-side end link member 5 intersects with the central axis C2 of each revolute pair of the proximal-side end link member 5 and the proximal-side intermediate link member 6 at the center PA of a proximal-end-side spherical link. Similarly, the central axis C1 of each revolute pair of the distal-end-side link hub 2 and the distal-side end link member 8 intersects with the central axis C2 of each revolute pair of the distal-side end link member 8 and the distal-side intermediate link member 7 at the center PB of a distal-end-side spherical link.

The central axis C2 of each revolute pair of the proximal-side end link member 5 and the proximal-side intermediate link member 6 intersects with the central axis C2 of each revolute pair of the distal-side end link member 8 and the distal-side intermediate link member 7 at a single point. A magnitude of an angle γ formed by the central axes C2, C2 of these revolute pairs varies according to a distance D between the centers of the spherical links of the parallel link mechanism 1. Although the magnitude of the angle γ changes according to the distance D between the centers of the spherical links of the parallel link mechanism 1, the angle γ for the respective link mechanisms 4 has the same value.

FIG. 7 shows a relationship among the central axis C1 of each revolute pair of the proximal-end-side link hub 2 and the proximal-side end link member 5; the central axis C2 of each revolute pair of the proximal-side end link member 5 and the proximal-side intermediate link member 6; and the center PA of the proximal-end-side spherical link. The point at which the central axes C1, C2 of the revolute pairs intersect is the center PA of the proximal-end-side spherical link. Although, in this example, an axial angle α that is an angle formed by the central axes C1, C2 of the revolute pairs is 90°, the axial angle α may have an angle other than 90°.

Although it is not illustrated, there is the same relationship among the central axis C1 of each revolute pair of the distal-end-side link hub 3 and the distal-side end link member 8; the central axis C2 of each revolute pair of the distal-side end link member 8 and the distal-side intermediate link member 7; and center PB of the distal-end-side spherical link, as the relationship on the proximal end side.

On the proximal end side and the distal end side, there is the same distance from each revolute pair part T1 of the link hub 2 (3) and the end link member 5 (8) to the center PA (PB) of the spherical link. There is also the same distance from each revolute pair part T2 of the end link member 5 (8) and the intermediate link member 6 (7) to the center PA (PB) of the spherical link. Although FIG. 7 shows the revolute pair parts T1, T2 on the proximal end side, the configuration is the same for the revolute pair parts T1, T2 on the distal end side. The "positions of the revolute pair parts T1, T2" herein refer to positions at axial centers of opposite portions of the two revolute pairs on the central axes C1, C2 of the two revolute pairs.

In FIG. 7, the revolute pair part T2 of the proximal-side end link member 5 and the proximal-side intermediate link member 6 is indicated at a position of the axial center of two bearings 16 (FIG. 8) on the central axis C2 of the revolute pair. Instead, the revolute pair part T2 may be indicated at a position on the central axis C2 of the revolute pair, at which the distance from the center PA of the spherical link of the proximal-end-side link hub 2 is the same for all the three link mechanisms 4. Thus, when the revolute pair part T2 is indicated at a position that is represented as a single point, the revolute pair part T2 of each link mechanism 4 is always located on the same circumference E, as shown in FIG. 5.

Figure 10:
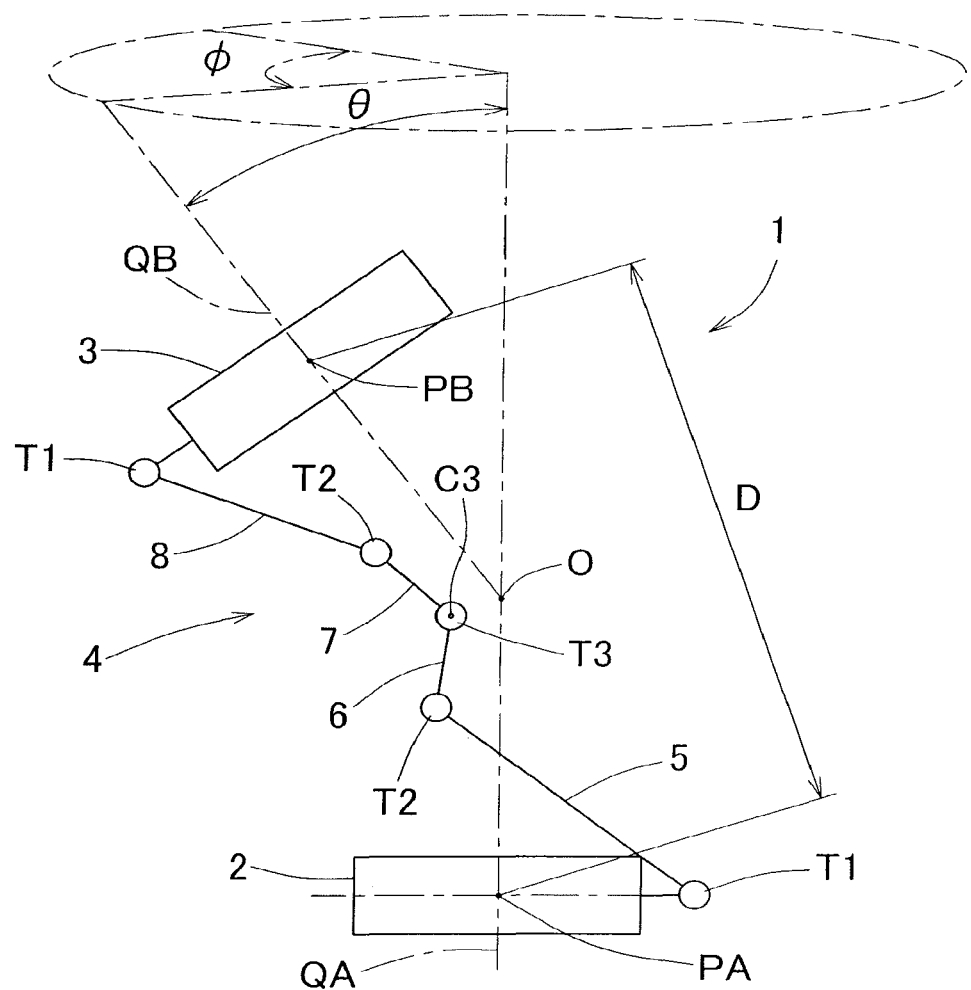
FIG. 10 illustrates one link mechanism of the link actuation device with straight lines.

The three link mechanism 4 have geometrically the same shape. The expression "geometrically the same shape" means that, as shown in FIG. 10, a geometric model that represents the respective link members 5, 6, 7, 8 with straight lines, that is, a model that is represented by the respective revolute pair parts T1, T2, T3 and lines connecting these revolute pair parts, has such a shape that a proximal side part and a distal side part are symmetrical to each other about a rotation axis C3 between intermediate link members that is a central axis of a revolute pair of proximal-side and distal-side intermediate link members 6, 7. FIG. 10 illustrates one link mechanism 4 with straight lines.

The parallel link mechanism 1 of this embodiment is of a rotationally symmetric type. That is, the parallel link mechanism has a rotationally symmetric positional relationship between: the proximal side part composed of the proximal-end-side link hub 2, the proximal-side end link member 5 and the proximal-side intermediate link member 6; and the distal side part composed of the distal-end-side link hub 3, the distal-side end link member 8 and the distal-side intermediate link member 7 about the rotation axis C3 of the intermediate link members.

The proximal-end-side link hub 2, the distal-end-side link hub 3, and the three link mechanisms 4 cooperate together to form a mechanism having three degrees of freedom that allows the distal-end-side link hub 3 to be rotatably moved relative to the proximal-end-side link hub 2 about two orthogonal axes and a distance D between the centers of the spherical links to be varied. In other words, this mechanism is operable to change the posture of the distal-end-side link hub 3 relative to the proximal-end-side link hub 2 with two degrees of freedom in rotation and to vary the distance between the proximal-end-side and the distal-end-side link hubs. This mechanism having three degrees of freedom makes it possible to achieve a configuration that is compact and provides a wide operating range for the distal-end-side link hub 3 relative to the proximal-end-side link hub 2.

The line that passes through the center PA of the proximal-end-side spherical link and orthogonally intersects with the central axis C1 of each revolute pair of the proximal-end-side link hub 2 and the proximal-side end link member 5 is referred to as a central axis QA of the proximal-end-side link hub 2. Similarly, the line that passes through the center PB of the distal-end-side spherical link and orthogonally intersects with the central axis C1 of each revolute pair of the distal-end-side link hub 3 and the distal-side end link member 8 is referred to as a central axis QB of the distal-end-side link hub 3.

In that case, a bend angle θ between the central axis QA of the proximal-end-side link hub 2 and the central axis QB of the distal-end-side link hub 3 may have a maximum angle of about ±90°. A turning angle φ of the distal-end-side link hub 3 with respect to the proximal-end-side link hub 2 may be set in a range of 0° to 360°. The bend angle θ is a vertical angle at which the central axis QB of the distal-end-side link hub 3 is tilted relative to the central axis QA of the proximal-end-side link hub 2. The turning angle φ is a horizontal angle at which the central axis QB of the distal-end-side link hub 3 is tilted relative to the central axis QA of the proximal-end-side link hub 2.

Figure 2:
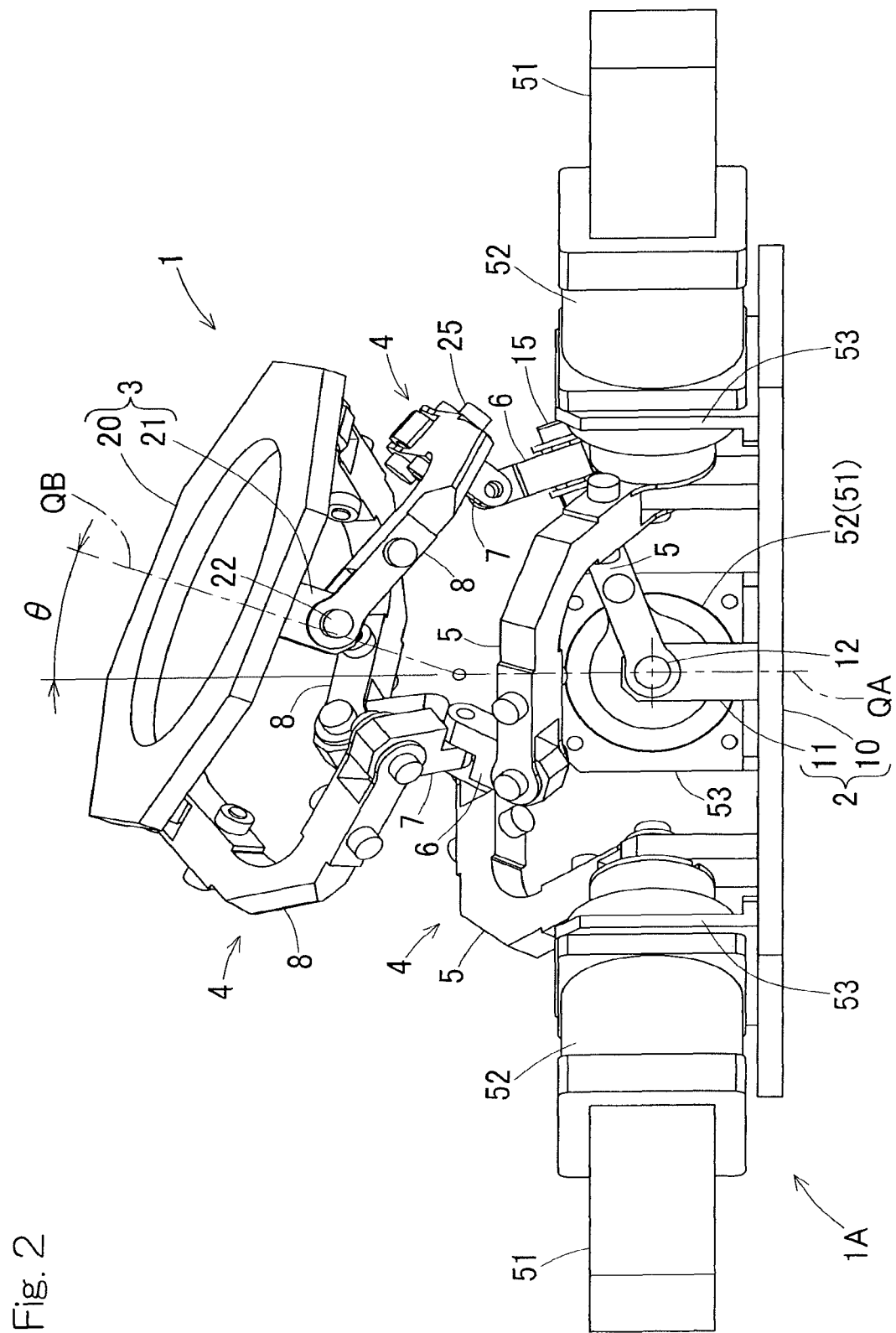
FIG. 2 is a front view illustrating another state of the same link actuation device.
Figure 3:
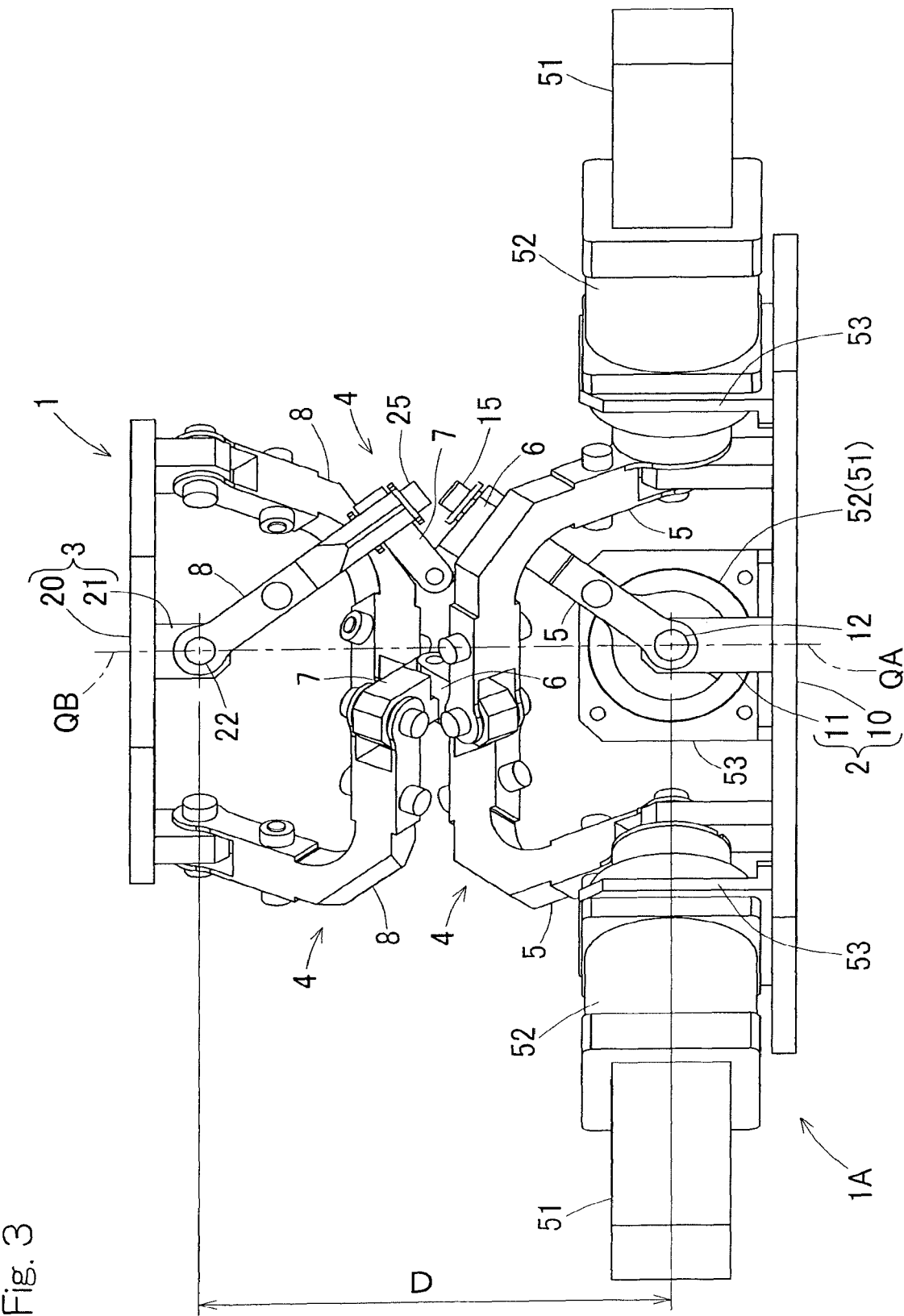
FIG. 3 is a front view illustrating yet another state of the link actuation device.
Figure 4:
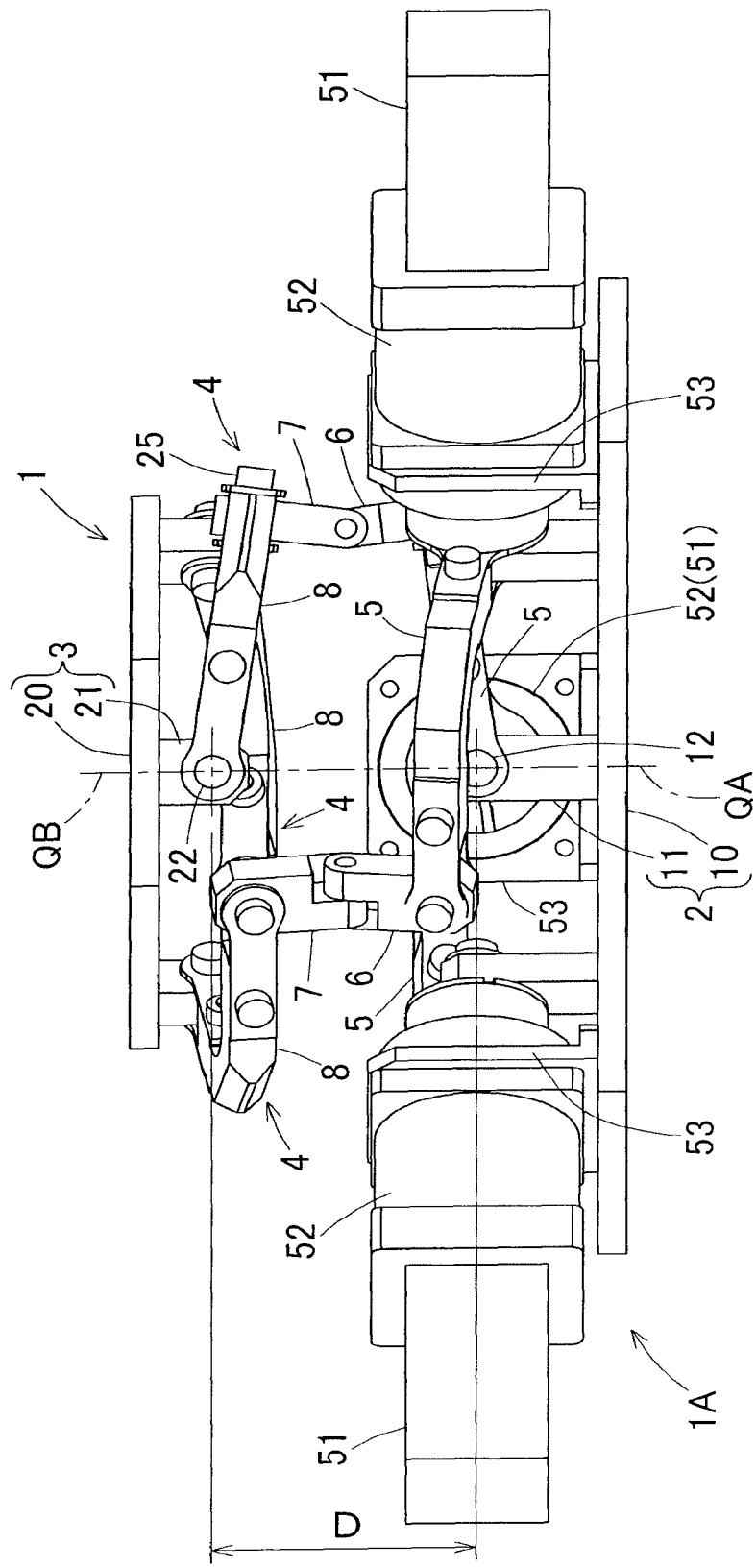
FIG. 4 is a front view illustrating yet another state of the link actuation device.

The posture of the distal-end-side link hub 3 relative to the proximal-end-side link hub 2 is changed about a rotation center O that is an intersection of the central axis QA of the proximal-end-side link hub 2 and the central axis QB of the distal-end-side link hub 3. FIG. 1, FIG. 3 and FIG. 4 show states where the central axis QA of the proximal-end-side link hub 2 and the central axis QB of the distal-end-side link hub 3 are on the same line. FIG. 2 shows a state where the central axis QB of the distal-end-side link hub 3 forms a certain operation angle θ with respect to the central axis QA of the proximal-end-side link hub 2.

The distance D between the center PA of the proximal-end-side spherical link and the center PB of the distal-end-side spherical link changes in accordance with the angle γ of the parallel link mechanism 1. FIG. 3 shows a state where the distance D between the centers of the spherical links reaches a maximum. FIG. 4 shows where the distance D between the centers of the spherical links reaches a minimum.

Where each of the link mechanisms 4 satisfies the following conditions (1) to (5), the proximal side part including the proximal-end-side link hub 2, the proximal-side end link member 5 and the proximal-side intermediate link member 6 moves in the same manner as the distal side part including the distal-end-side link hub 3, the distal-side end link member 8 and the distal-side intermediate link member 7 because of the geometric symmetry. Therefore, the parallel link mechanism 1 functions as a constant velocity universal joint that has the same rotation angle and rotates at a constant velocity on the proximal end side and the distal end side, when rotation is transmitted from the proximal end side to the distal end side.

Condition 1: the central axes C1 of the revolute pairs of the proximal-end-side link hub 2 and the proximal-side end link members 5 of the respective link mechanisms 4 have mutually the same angle and length, and the central axes C1 of the revolute pairs of the distal-end-side link hub 3 and the distal-side end link members 8 of the respective link mechanisms 4 also have mutually the same angle and length.

Condition 2: on the proximal end side and the distal end side, the central axis C1 of the revolute pair of the link hub 2 (3) and the end link member 5 (8) intersects with the central axis C2 of the revolute pair of the end link member 5 (8) and the intermediate link member 6 (7) at the center PA of the spherical link (PB).

Condition 3: the proximal-side end link member 5 and the distal-side end link member 8 have the same geometric shape.

Condition 4: the proximal-side intermediate link member 6 and the distal-side intermediate link member 7 have the same geometric shape.

Condition 5: a proximal side member including the proximal-side intermediate link member 6 and the proximal-side end link member 5 has the same angular positional relationship as that of a distal side member including the distal-side intermediate link member 7 and the distal-side end link member 8 with respect to the rotation axis C3 of the intermediate link members.

As shown in FIG. 1 to FIG. 4, the proximal-end-side link hub 2 includes a plate-like proximal end member 10 and three rotation support members 11 provided on a circumference of the proximal end member 10 at equal intervals. In the illustrated example, the plate-like proximal end member 10 is disposed such that upper and lower surfaces thereof are horizontally arranged, and the respective rotation support members 11 protrude upwardly from the upper surface of the proximal end member 10. The proximal end member 10 does not necessarily have a plate-like shape.

As shown in FIG. 7, the center of the circumference on which the three rotation support members 11 are provided is located at a position overlapping with the center PA of the proximal-end-side spherical link in plan view. In other words, the center is located on the central axis QA of the proximal-end-side link hub 2. The proximal end member 10 is formed with a through hole 10a in a central part thereof around which the rotation support members 11 are disposed. The center of the through hole 10a is also located on the central axis QA of the proximal-end-side link hub 2.

Figure 8:
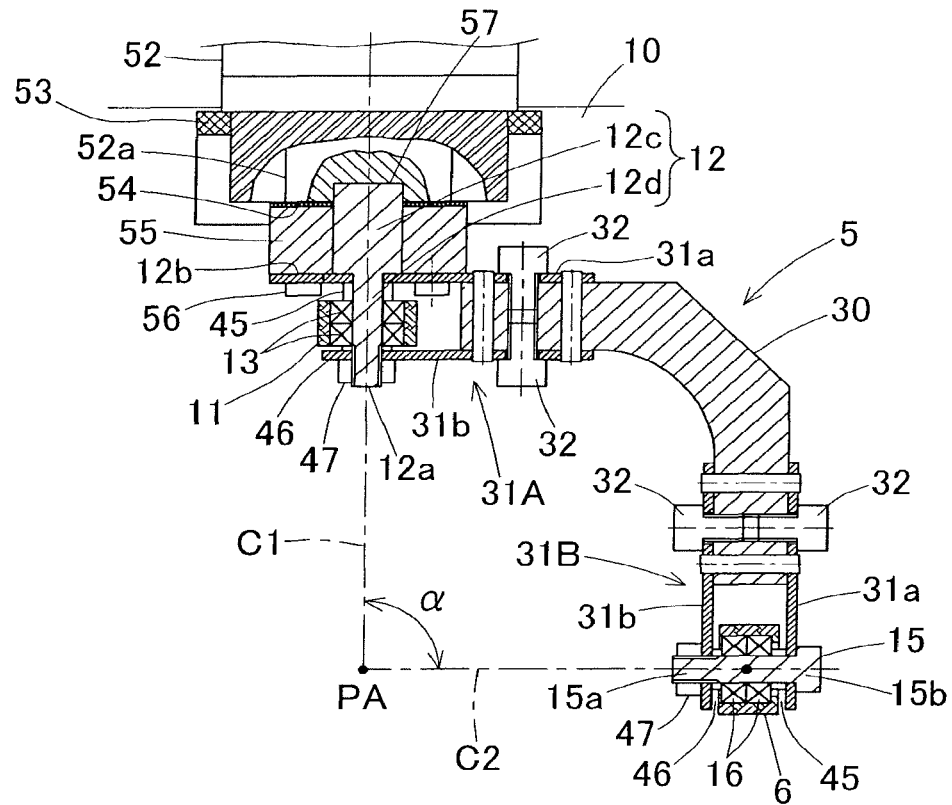
FIG. 8 is a partially enlarged view of FIG. 7.

FIG. 8 is a partially enlarged view of FIG. 7. As shown in FIG. 8, each of the rotation support members 11 is rotatably coupled to one end of the proximal-side end link member 5. Specifically, each of the rotation support members 11 rotatably supports a rotation shaft 12 via two bearings 13, and one end of the proximal-side end link member 5 is coupled to the rotation shaft 12.

The other end of the proximal-side end link member 5 is coupled to one end of the proximal-side intermediate link member 6. Specifically, the proximal-side intermediate link member 6 rotatably supports a rotation shaft 15 via two bearings 16, and the other end of the proximal-side end link member 5 is coupled to the rotation shaft 15.

The bearings 13, 16 may be, for example, ball bearings, such as a deep groove ball bearing and an angular ball bearing. These bearings 13, 16 are fixed to the rotation support members 11 or the proximal-side intermediate link member 6 through e.g. press-fitting, bonding, or crimping. Instead of using the bearings 13, 16 as in this example, the rotation shafts 12, 15 may be disposed in contact with the rotation support members 11 or the proximal-side intermediate link member 6 in a rotatable manner so that the rotation shafts 12, 15 are rotatably supported.

The illustrated proximal-side end link member 5 includes a bent part 30 and rotation coupling parts 31A, 31B on the link hub side and on the intermediate link member side which are disposed on opposite ends of the bent part 30. The bent part 30 is, for example, a cast product of a metal material and has a bent shape having a predetermined axial angle α (in this example, 90°). Each of the rotation coupling parts 31A, 31B includes two rotation coupling bodies 31a, 31b having a flat-plate shape that are formed of, for example, metal plates, and these rotation coupling bodies 31a, 31b are arranged in parallel with each other. Each of the rotation coupling bodies 31a, 31b are fixed to an end portion of the bent part 30 via a bolt 32. It should be noted the proximal-side end link member 5 may be a single article integrally formed with the bent part 30 and the rotation coupling parts 31A, 31B.

The coupling part between the rotation support members 11 and the proximal-side end link member 5 will be described in detail.

The rotation support members 11 are disposed between the two rotation coupling bodies 31a, 31b of the rotation coupling part 31A on the link hub side. The rotation shaft 12 is sequentially inserted into respective through holes of the rotation coupling body 31a on an outer side, a spacer 45, inner rings of the two bearings 13, a spacer 46 and the rotation coupling body 31b on an inner side from an outer diameter side, and a nut 47 is screwed onto an external thread portion 12a on an internal diameter end. In this way, a stepped surface 12b (which will be described later) of the rotation shaft 12 and the nut 47 hold the pair of the rotation coupling bodies 31a, 31b, the inner rings of the two bearings 13 and the two spacers 45, 46 therebetween such that the proximal-side end link member 5 and the rotation support members 11 are rotatably coupled to each other, with the bearings 13 being preloaded.

The coupling part between the proximal-side end link member 5 and the proximal-side intermediate link member 6 will be described in detail.

One end of the proximal-side intermediate link member 6 is disposed between the two rotation coupling bodies 31a, 31b of the rotation coupling part 31B on the intermediate link member side. The rotation shaft 15 is sequentially inserted into respective through holes of the rotation coupling body 31a on the outer side, a spacer 45, inner rings of the two bearings 16, a spacer 46 and the rotation coupling body 31b on the inner side from an outer diameter side, and a nut 47 is screwed onto an external thread portion 15a on an internal diameter end. In this way, a head portion 15b of the rotation shaft 15 and the nut 47 hold the two rotation coupling bodies 31a, 31b, the inner rings of the two bearings 16, and the two spacers 45, 46 therebetween such that the proximal-side end link member 5 and the proximal-side intermediate link member 6 are rotatably coupled to each other, with the bearings 16 being preloaded.

As shown in FIG. 1 to FIG. 4, the distal-end-side link hub 3 includes a plate-like distal end member 20 and three rotation support members 21 provided on a circumference of the distal end member 20 at equal intervals. The center of the circumference on which the three rotation support members 21 are disposed is located on the central axis QB of the distal-end-side link hub 3. Each of the rotation support members 21 rotatably supports a rotation shaft 22, and an end of the distal-side end link member 8 is coupled to the rotation shaft 22. The other end of the distal-side end link member 8 rotatably supports a rotation shaft 25, and one end of the distal-side intermediate link member 7 is coupled to the rotation shaft 25.

Although FIG. 8 shows a coupling part between the proximal-end-side link hub 2 and the proximal-side end link member 5 and a coupling part between the proximal-side end link member 5 and the proximal-side intermediate link member 6, these configurations are also the same in the coupling part between the distal-end-side link hub 3 and the distal-side end link member 8 and the coupling part between the distal-side end link member 8 and the distal-side intermediate link member 7 (not illustrated), except for some parts.

Figure 9:
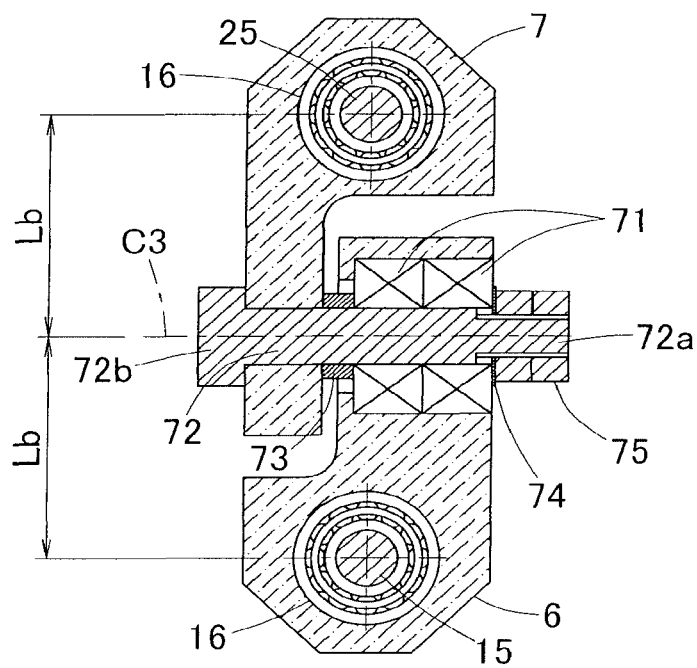
FIG. 9 is a sectional view along line IX-C3-IX in FIG. 5.

FIG. 9 is a sectional view along line IX-C3-IX in FIG. 5 and shows a coupling part between the other ends of the proximal-side intermediate link member 6 and the distal-side intermediate link member 7. Two bearings 71 are provided to the other end of the proximal-side intermediate link member 6, and these bearings 71 rotatably support a rotation shaft 72 fixed to the other end of the distal-side intermediate link member 7. The bearings 71 may be, for example, ball bearings, such as a deep groove ball bearing and an angular ball bearing. These bearings are fixed to the proximal-side intermediate link member 6 through e.g. press-fitting, bonding, or crimping. Instead of using the bearings 71 as in this example, the rotation shaft 72 may be disposed in contact with the proximal-side intermediate link member 6 in a rotatable manner so that the rotation shaft 72 are rotatably supported.

The rotation shaft 72 has one end provided with an external thread portion 72a and the other end provided with a head portion 72b having a larger diameter than that of the remaining part. The rotation shaft 72 is sequentially inserted into respective through holes of the distal-side intermediate link member 7, a spacer 73, inner rings of the two bearings 71 and a spacer 74, and double nuts 75 are screwed onto the external thread portion 72a. In this way, the head portion 72b of the rotation shaft 72 and the double nuts 75 hold the distal-side end link member 7, the inner rings of the two bearings 71 and the two spacers 73, 74 therebetween such that the proximal-side intermediate link member 6 and the distal-side intermediate link member 7 are rotatably coupled to each other, with the bearings 71 being preloaded.

As shown in FIG. 7, each of the three link mechanisms 4 is provided with an actuator 51 configured to arbitrarily change the posture of the distal-end-side link hub 3 relative to the proximal-end-side link hub 2 and the distance therebetween. Provision of the actuators 51 to all the three link mechanisms 4 makes it possible to define the operation of the parallel link mechanism 1. Even where there are four or more link mechanisms 4, the operation of the parallel link mechanism 1 can be defined by providing such actuators 51 to three or more of the link mechanisms 4. Each of the actuators 51 is controlled by the control unit 61.

The actuators 51 are rotary actuators each having a speed reduction mechanism 52 and are disposed on an upper surface of the proximal end member 10 of the proximal-end-side link hub 2 so as to be coaxial with the rotation shaft 12. The actuators 51 and the speed reduction mechanisms 52 are integrally provided to each other, and the speed reduction mechanisms 52 are fixed to the proximal end member 10 by motor fixing members 53.

In FIG. 8, each of the speed reduction mechanisms 52 is a flange output type and has an output shaft 52a having a large diameter. The output shaft 52a has a tip end surface that is a planer flange surface 54 orthogonally intersecting with the center line of the output shaft 52a. The output shaft 52a is connected to the rotation coupling body 31a on the outer diameter side of the rotation coupling part 31A on the link hub side in the proximal-side end link member 5, via a spacer 55 and by use of a bolt 56. The rotation shaft 12 coupling the proximal-end-side link hub 2 and the proximal-end-side link hub 5 includes a large diameter portion 12c and a small diameter portion 12d. The large diameter portion 12c is fitted to an inner diameter groove 57 provided to the output shaft 52a of the speed reduction mechanism 52 such that the rotation shaft 12 is coupled to the output shaft 52a, and the small diameter portion 12d is inserted into the inner rings of the bearing 13 etc. The small diameter portion 12d is provided with an external thread portion 12a. A boundary part between the large diameter portion 12c and the small diameter portion 12d forms the stepped surface 12b.

As described above, by providing bearings 12, 16, 71 to the respective revolute pair parts T1, T2, T3 of each link mechanism 4, it is possible to suppress friction resistance to reduce rotation resistance in the revolute pair parts T1, T2, T3. As a result, it is possible to ensure smooth power transmission as well as to enhance durability.

The configuration including the bearings 12, 16, 71 can suppress rattling at the revolute pair parts T1, T2, T3 because the bearings 12, 16, 71 are preloaded such that radial clearance and thrust clearance are eliminated. Consequently, a rotation phase difference is eliminated between the proximal-end-side link hub 2 side and the distal-end-side link hub 3 side, making it possible to maintain speed uniformity as well as to prevent vibration and/or noise. In particular, the bearings 12, 16, 71 has negative bearing clearance so that backlash occurring between an input and an output can be reduced.

Control System

The controller 60 includes an operation tool (not illustrated), such as a keyboard and a touch panel, for operating the link actuation device. The operation tool can be operated so as to rotationally drive the respective actuators 51, thereby to actuate the parallel link mechanism 1. Specifically, when the actuators 51 are rotationally driven, the rotation is transmitted to the proximal-side end link members 5 through the speed reduction mechanisms 52 so as to change the angles of the proximal-side end link members 5 relative to the proximal-end-side link hub 2. This defines the posture of the distal-end-side link hub 3 relative to the proximal-end-side link hub 2 and the distance D between the centers of the spherical links.

The controller 60 includes the control unit 61 configured to control the respective actuators 51 and the posture calculator 62 configured to calculate the posture (θ, φ) of the distal-end-side link hub 3 relative to the proximal-end-side link hub 2 and the distance D between the centers of the spherical links. The control unit 61 and the posture calculator 62 are of computer numerical control type. Although the control unit 61 and the posture calculator 62 are constituted as separate devices in this example, they may be integrated into a single unit. The control unit 61 and the posture calculator 62 may also be provided separately from the controller 60.

When the control unit 61 receives a command of the posture (θ, φ) of the distal-end-side link hub 3 and the distance D between the centers of the spherical links from the operation tool, the control unit 61 calculates the rotation angle βn (n=1, 2, 3) of the respective proximal-side end link members 5 in accordance with the command and controls the respective actuators 51 so as to attain the calculated rotation angle βn. The rotation angle βn is a rotation angle of each of the reference end link members 5 in accordance with the commanded posture (θ, φ) of the distal-end-side link hub 3 and the commanded distance D between the centers of the spherical links, and is, for example, an angle from a horizontal plane, as shown in FIG. 5. The "n" denotes numbers of the proximal-side end link members 5 (distal-side end link members 8): "β1" denotes a rotation angle of a first proximal-side end link member 5, "β2" denotes a rotation angle of a second proximal-side end link member 5, and "β3" denotes a rotation angle of a third proximal-side end link member 5.

The control unit 61 uses the following equations for the control of the respective actuators 51.

[Math 3]

$$\begin{pmatrix} \cos(\gamma/2)\cos\varepsilon 0 \\ \pm\sin\alpha\cos\beta n \\ \sin\alpha\sin\beta n \end{pmatrix} = \begin{pmatrix} \cos(\phi-\delta n) & -\sin(\phi-\delta n) & 0 \\ \sin(\phi-\delta n) & \cos(\phi-\delta n) & 0 \\ 0 & 0 & 1 \end{pmatrix} \begin{pmatrix} \cos(\theta/2) & 0 & \sin(\theta/2) \\ 0 & 1 & 0 \\ -\sin(\theta/2) & 0 & \cos(\theta/2) \end{pmatrix}$$

$$\begin{pmatrix} \cos(\phi-\delta n) & \sin(\phi-\delta n) & 0 \\ -\sin(\phi-\delta n) & \cos(\phi-\delta n) & 0 \\ 0 & 0 & 1 \end{pmatrix} \begin{pmatrix} \cos(\gamma/2)\cos\varepsilon n \\ \cos(\gamma/2)\sin\varepsilon n \\ \sin(\gamma/2) \end{pmatrix}$$

equation 1

$$\frac{\gamma}{2} = \sin^{-1}\left(\frac{D}{2\sqrt{La^2+Lb^2}}\right) - \tan^{-1}\left(\frac{Lb}{La}\right)$$

equation 2

$$\varepsilon_0 = \pm\sin^{-1}\left(\sqrt{\frac{\sin^2\alpha - \sin^2(\gamma/2)}{\cos^2(\gamma/2)}}\right)$$

equation 3

It should be noted that the 3×3 matrix on the right side of equation 1 is a transformation matrix using Euler angles of (φ−δn), θ, −(φ−δn).

The "La," "Lb" in equation 2 are shown in FIG. 5. That is, the "La" denotes a distance from the projection line F obtained by vertically projecting the rotation axis C3 of the intermediate link members onto a plane including the central axis C2 of the revolute pair of the end link member 5, 8 and the intermediate link member 6, 7 and the central axis C1 of the revolute pair of the link hub 2, 3 and the end link member 5, 8, to the center PA, PB of the spherical link. The "Lb" is a distance from the projection line F to the rotation axis C3 of intermediate link members. These "La," "Lb" are design values for the link actuation device.

Figure 11A:
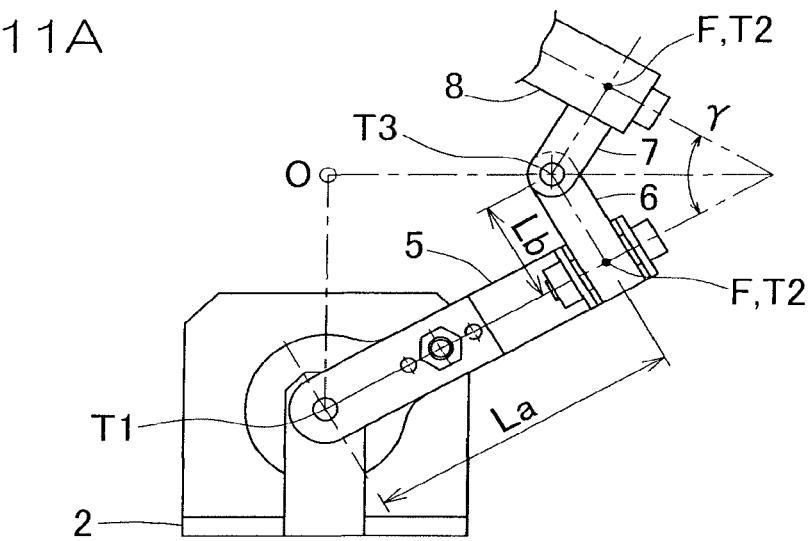
FIG. 11A illustrates a positional relationship of a projection line to a revolute pair part of an end link member and an intermediate link member.
Figure 11B:
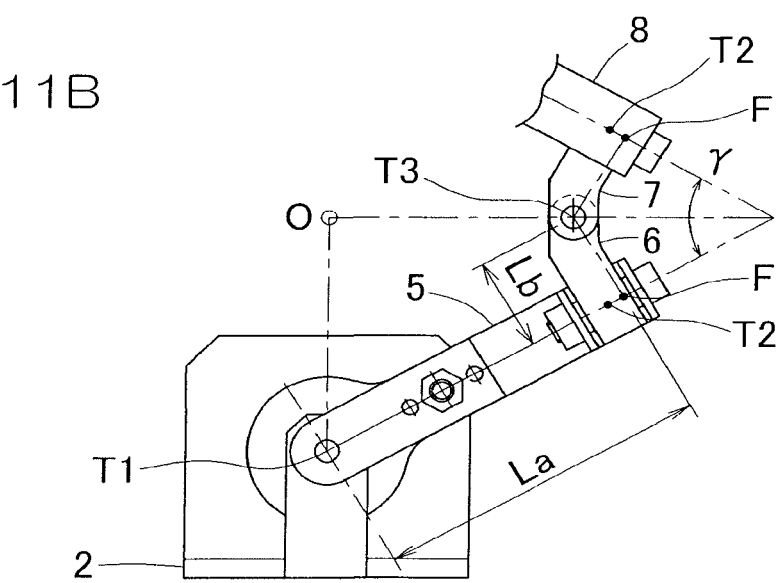
FIG. 11B illustrates another example of a positional relationship of a projection line to a revolute pair part of an end link member and an intermediate link member.
Figure 11C:
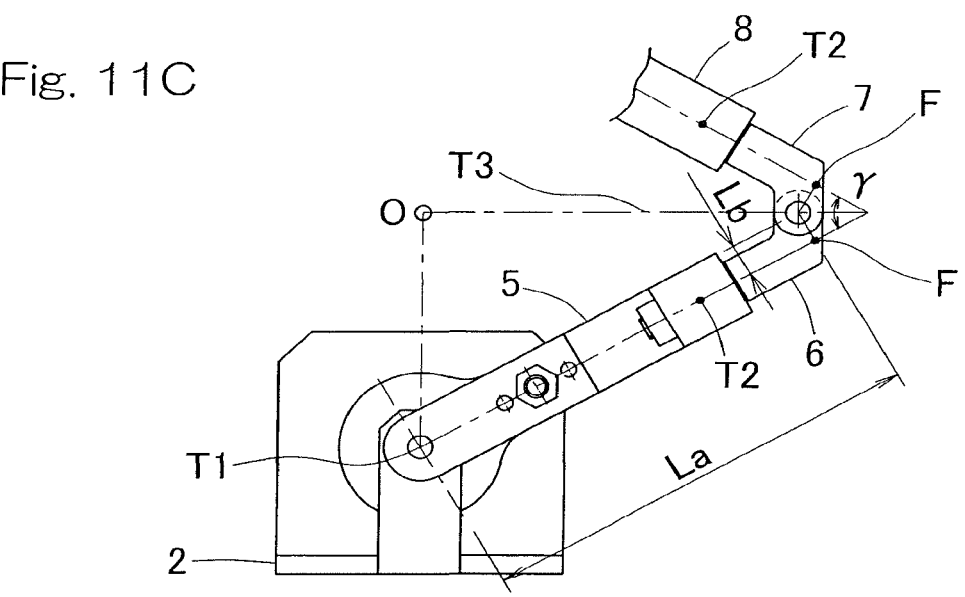
FIG. 11C illustrates yet another example of a positional relationship of a projection line to a revolute pair part of an end link member and an intermediate link member.

In this embodiment, the projection line F coincides with the revolute pair part T2 of the end link member 5, 8 and the intermediate link member 6, 7, as shown in FIG. 11A. However, as shown in FIG. 11B, FIG. 11C, the projection line F and the revolute pair part T2 do not necessarily coincide with each other.

The δn (n=1, 2, 3, . . . ) in equation 1 is a separation angle at which each of the proximal-side end link members 5 is separated in the circumferential direction with respect to the proximal-side end link member 5, of the respective proximal-side end link members, that serves as a reference. That is, as shown in FIG. 7, one of the three link mechanisms 4 is defined as a reference link mechanism 4, and the phase, in the circumferential direction, of the central axis C1 of the revolute pair of the proximal-side end link member 5 (5A) in the reference link mechanism 4 is defined as δ1 (for example, δ1=0°). The respective separation angles at which the central axes C1 of the revolute pairs of the other two proximal-side end link members 5 are separated in the circumferential direction with respect to the central axis C1 of the revolute pair of this reference proximal-side end link member 5A are defined as β2, β3. The positive direction of the separation angle δn (n=1, 2, 3) corresponds to a counterclockwise direction when seen from the side of the distal-end-side link hub 3.

The εn (n=1, 2, 3, . . . ) in equation 1 is a separation angle at which each of the projection lines F on the proximal side is separated in the circumferential direction from a reference phase on the circumference through which the projection lines F on the proximal side pass. That is, the separation angle, in the circumferential direction, of the revolute pair part T1 of the reference link mechanism 4 with respect to the central axis C1 of the revolute pair of the proximal-side end link member 5A is defined as ε1. The respective separation angles, in the circumferential direction, of the other two revolute pair parts T1 with respect to the revolute pair part T1 of the reference link mechanism 4 are defined as ε2, ε3 (not illustrated). The positive direction of the separation angle εn (n=1, 2, 3) also corresponds to the counterclockwise direction when seen from the side of the distal-end-side link hub 3. As shown in FIG. 5, the phase, in the circumferential direction, of the revolute pair part T1 of the reference link mechanism 4 in a state where the posture of the distal-end-side link hub 3 is at the origin position (θ=0, φ=0) is ε0 (equation 3).

When control is performed to attain a desired posture (θ, φ) of the distal-end-side link hub 3 and a desired distance D between the centers of the spherical links, γ/2 is calculated by substituting La, Lb that are design values and the distance D that is a control target value into equation 2. The calculated γ/2 and the posture (θ, φ) that is a control target value are then substituted into equation 1 and equation 3 to calculate the rotation angles β1 to β3 of the end link members 5. The calculation of the rotation angles β1 to β3 is performed by reverse converting equation 1 such that the relationship represented in equation 1 is satisfied. The phrase "reverse conversion" or the like refers to a conversion for calculating the rotation angle βn of the proximal-side end link member 5 from the bend angle θ, the turning angle φ (FIG. 10), and the distance D between the centers of the spherical links. There is a mutual relationship between the bend angle θ, the turning angle φ and the distance D between the centers of the spherical links; and the rotation angle βn, and it is thus possible to derive one from the other. A command is given to the respective actuators 51 based on the rotation angles β1 to β3 calculated in this way.

The phase ε0, in the circumferential direction, of the revolute pair part T1 of the reference link mechanism 4 has two different solutions depending on the directions in which the proximal-side end link member 5 is assembled with respect to the proximal-end-side link hub 2. Thus, the directions in which the proximal-side end link member 5 is assembled with respect to the proximal-end-side link hub 2 determine which of the signs (plus or minus) is assigned to the second line on the left-hand side of equation 1 and the right-hand side of equation 3. The "+" sign indicates that the proximal-side end link member is assembled toward the right-hand side, whereas the "−" sign indicates that the end link member is assembled toward the left-hand side. Where the proximal-side end link member 5 is assembled toward the left-hand side (i.e. arranged on the right-hand side in the figure) as in the embodiment in FIG. 5, the "−" sign is assigned.

Since equation 3 includes the axial angle α of the end link members 5, 8 as an independent variable, the axial angle α of the end link members 5, 8 of each link actuation device is substituted into α in equation 3. This also makes it possible to control the operation of the link actuation device in which the end link members 5, 8 have an axial angle α other than 90°.

The posture calculator 62 makes it possible to calculate the current posture (θ, φ) of the distal-end-side link hub 3 and the current distance D between the centers of the spherical links by substituting the current rotation angle βn of the proximal-side end link member 5 into equation 1 and converting the equation. As described above, by assigning the axial angle α of the end link members 5, 8 of each link actuation device to α in equation 3, it is possible to calculate the posture (θ, φ) of the distal-end-side link hub 3 and the distance D between the centers of the spherical links also for the link actuation device 51 including the end link members having an axial angle α other than 90°. A result of calculation by the posture calculator 62 is, for example, displayed on a screen of the display device 63 provided to the controller 60. The result of calculation by the posture calculator 62 may be used in the control by the control unit 61.

Figure 12:
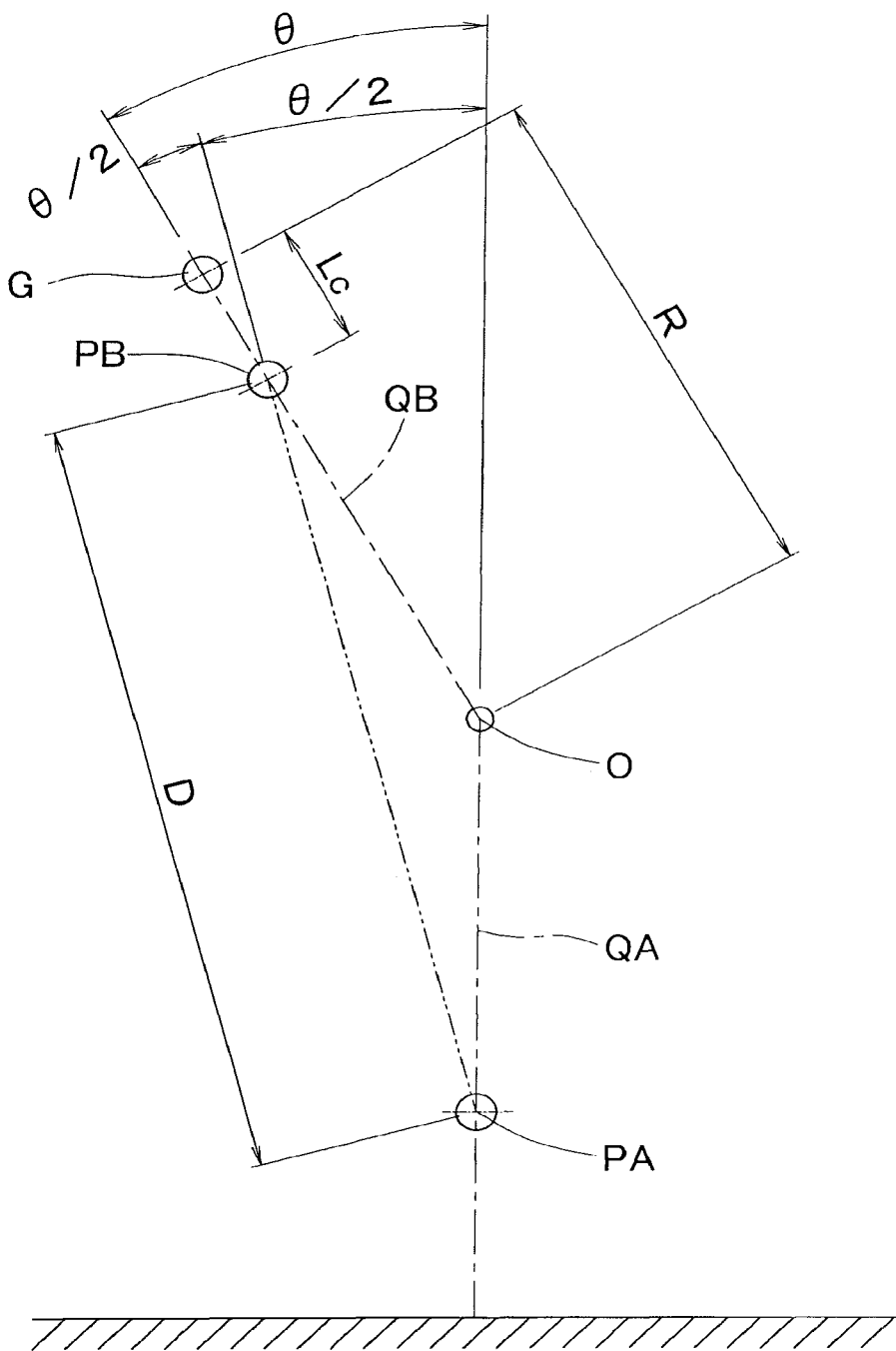
FIG. 12 illustrates an angle formed by a line connecting the centers of spherical links and a central axis of a link hub, with straight lines.

As shown in the diagram of FIG. 12, the parallel link mechanism 1 has an angle of θ/2 between the line connecting both centers PA, PB of the spherical links and the central axis QA of the proximal-end-side link hub 2, regardless of its posture. Similarly, the angle formed by the line connecting both centers PA, PB of the spherical links and the central axis QB of the distal-end-side link hub 3 is also θ/2. Therefore, the following equation holds, in which Lc denotes a distance from the center PB of the distal-end-side spherical link hub to a work point G.

$$D = 2(R - Lc)\cos(\theta/2) \qquad \text{equation 4}$$

Use of equation 4 makes it possible to define the posture (θ, φ) of the distal-end-side link hub 3 with a constant rotation radius R of the work point G. Where the rotation radius R of the work point G remains constant, the work point G of the distal-end-side link hub 3 moves on the surface of a sphere. That is, the motion of the work point G of the distal-end-side link hub 3 is limited to the motion directed in tangential directions of the sphere, and the rotation center O of the distal-end-side link hub 3 is not moved. Therefore, the conversion of coordinates for calculating a position of the work point G can be simplified.

It should be noted that although, in FIG. 5, the work point G is located at a position where the central axis QB of the distal-end-side link hub 3 intersects with a distal end plane of the distal-end-side link hub 3 on a tip end surface of the distal end member 20, the work point G may be located at a different position as long as it is on the central axis QB of the distal-end-side link hub 3.

Thus, the control of the respective actuators 51 by the control unit 61 makes it possible to operate the parallel link mechanism 1 to an arbitrary operation position. FIG. 1 shows an origin position in which the bend angle θ is 0° and the distance D between the centers of the spherical links is moderate. FIG. 2 shows a state where the distal-end-side link hub 3 is inclined by an arbitrary bend angle θ, compared to the origin position. FIG. 3 shows a state where the bend angle θ is 0° and the distance D between the centers of the spherical links is at the maximum. FIG. 4 shows a state where the bend angle θ is 0° and the distance D between the centers of the spherical links is at the minimum.

The distance D between the centers of the spherical links decreases as the angle γ is made smaller and increases as the angle γ is made larger. As in FIG. 4, where the angle γ is small and the distance D between the centers of the spherical links is reduced, the posture of the distal-end-side link hub 3 cannot be changed by a large amount. Therefore, it is advantageous to reduce the distance D between the centers of the spherical links, as in FIG. 4, when the link actuation device is not in use during normal operation and is retracted so as not to come into contact with other objects while not engaged in operation, or when it is desired to reduce its footprint while it is housed.

In other words, the link actuation device according to the above-mentioned embodiment may have a retreating function for reducing the distance between the centers of the spherical links to avoid contact with a peripheral object, or have a function for reducing the distance between the centers of the spherical links when the link actuation device is not in use.

Although the above embodiments employ the link actuation device including the link mechanisms 4 of rotational symmetry type, the present invention can also be applied to a link actuation device having link mechanisms 4 of mirror symmetry type (not illustrated). In the above-mentioned embodiment, the parallel link mechanism 1 is of rotational symmetry type and has such a configuration that the proximal side part including the proximal-end-side link hub 2, the proximal-side end link member 5 and the proximal-side intermediate link member 6 and the distal side part including the distal-end-side link hub 3, the distal-side end link member 8 and the distal-side intermediate link member 7 have a rotationally symmetrical positional relationship with each other about the rotation axis C3 of the intermediate link members.

Although the present invention has been described in terms of the preferred embodiments thereof with reference to the drawings, the present invention is not limited to the embodiments disclosed herein, and various additions, modifications, or deletions may be made without departing from the scope of the invention. Accordingly, such variants are included within the scope of the present invention.

REFERENCE NUMERALS

1 . . . parallel link mechanism
2 . . . proximal-end-side link hub
3 . . . distal-end-side link hub
4 . . . link mechanism
5 . . . proximal-side end link member
6 . . . proximal-side intermediate link member
7 . . . distal-side intermediate link member
8 . . . distal-side end link member
51 . . . actuator
61 . . . control unit
62 . . . posture calculator
C1 . . . central axis of a revolute pair of a link hub and an end link member
C2 . . . central axis of a revolute pair of an end link member and an intermediate link member
C3 . . . rotation axis of intermediate link members
F . . . projection line
G . . . work point
O . . . rotation center
PA . . . center of a proximal-end-side spherical link
PB . . . center of a distal-end-side spherical link
QA . . . central axis of the proximal-end-side link hub
QB . . . central axis of the distal-end-side link hub

What is claimed is:

1. A link actuation device, comprising:
a proximal-end-side link hub;
a distal-end-side link hub;
three or more link mechanisms each coupling the distal-end-side link hub to the proximal-end-side link hub such that a posture of the distal-end-side link hub is changeable relative to the proximal-end-side link hub, wherein each of the three or more link mechanisms includes:
a proximal-side end link member having one end rotatably coupled to the proximal-end-side link hub,
a distal-side end link member having one end rotatably coupled to the distal-end-side link hub,
a proximal-side intermediate link member having one end rotatably coupled to another end of the proximal-side end link member, and
a distal-side intermediate link member having one end rotatably coupled to another end of the distal-side end link member, and another end rotatably coupled to another end of the proximal-side intermediate link member,
wherein
a first central axis of a first revolute pair of the proximal-side end link member and the proximal-side intermediate link member intersects with a second central axis of a second revolute pair of the distal-side end link member and the distal-side intermediate link member at a single point,
the another end of the proximal-side intermediate link member and the another end of the distal-side intermediate link member are rotatably coupled to each other at a rotation axis of the proximal-side intermediate link member and the distal-side intermediate link member that is a third central axis of a third revolute pair of the proximal-side intermediate link member and the distal-side intermediate link member so that an angle formed by the first and second central axes of the first and second revolute pairs is changeable, for each of the link mechanisms, a geometric model that represents the link mechanism with straight lines has such a shape that a proximal side part and a distal side part are symmetrical to each other with respect to the rotation axis of the proximal-side intermediate link member and the distal-side intermediate link member;

actuators, provided to three or more link mechanisms among the three or more link mechanisms, configured to change a posture and a distance from the distal-end-side link hub to the proximal-end-side link hub; and a control unit configured to control the actuators, wherein in the proximal side part, a point at which a fourth central axis of a fourth revolute pair of the proximal-end-side link hub and the proximal-end-side link member intersects with the first central axis of the first revolute pair is referred to as a center of a proximal-end-side spherical link, and a line that passes through the center of the proximal-end-side spherical link and orthogonally intersects with the fourth central axis is referred to as a fifth central axis of the proximal-end-side link hub, in the distal side part, a point at which a sixth central axis of a fifth revolute pair of the distal-end-side link hub and the distal-side end link member intersects with the second central axis of the second revolute pair is referred to as a center of a distal-end-side spherical link, and a line that passes through the center of the distal-end-side spherical link and orthogonally intersects with the sixth central axis is referred to as a seventh central axis of the distal-end-side link hub, the control unit is configured to calculate a rotation angle $\beta n$ of the proximal-side end link member from a targeted posture $(\theta, \varphi)$ of the distal-end-side link hub relative to the proximal-end-side link hub and a targeted distance D between the center of the proximal-end-side spherical link and the center of the distal-end-side spherical link by inversely converting equation 1 below, such that relationships represented by equations 1, 2, and 3 below are satisfied, and control the respective actuators so as to attain the calculated rotation angle $\beta n$, the proximal side part includes:
- an axial angle $\alpha$ formed by the first central axis of the first revolute pair and the fourth central axis of the fourth revolute pair,
- a distance La from a first projection line obtained by vertically projecting the rotation axis of the proximal-side intermediate link member and the distal-side intermediate link member onto a plane including the first central axis of the first revolute pair and the fourth central axis of the fourth revolute pair, to the center of the proximal-end-side spherical link, and
- a distance Lb from the first projection line to the rotation axis of the proximal-side intermediate link member and the distal-side intermediate link member, the distal side part includes:
- the axial angle $\alpha$ formed by the second central axis of the second revolute pair and the sixth central axis of the fifth revolute pair,
- the distance La from a second projection line obtained by vertically projecting the rotation axis of the proximal-side intermediate link member and the distal-side intermediate link member onto a plane including the second central axis of the second revolute pair and the sixth central axis of the fifth revolute pair, to the center of the distal-end-side spherical link, and
- the distance Lb from the second projection line to the rotation axis of the proximal-side intermediate link member and the distal-side intermediate link member, the proximal-side end link member has the rotation angle $\beta n$ (n=1, 2, 3, . . . ) relative to the proximal-end-side link hub;

the seventh central axis of the distal-end-side link hub is inclined at a vertical angle $\theta$ relative to the fifth central axis of the proximal-end-side link hub;

the seventh central axis of the distal-end-side link hub is inclined at a horizontal angle $\varphi$ relative to the fifth central axis of the proximal-end-side link hub;

the center of the proximal-end-side spherical link has the distance D from the center of the distal-end-side spherical link;

the first central axis of the first revolute pair forms an angle $\gamma$ relative to the second central axis of the second revolute pair;

respective proximal-side end link members among the three or more link mechanisms are separated from each other at a separation angle $\delta n$ (n=1, 2, 3, . . . ) in a circumferential direction with respect to a proximal-side end link member of the respective proximal-side end link members which serves as a reference;

each first projection line on a respective proximal side part among the three or more link mechanisms is separated from each other at a separation angle $\varepsilon n$ (n=1, 2, 3, . . . ) in the circumferential direction with respect to a reference phase on a circumference through which the first projection lines pass;

a first projection line on one of the proximal side parts that serves as a reference has a separation angle $\varepsilon 0$ in a state where the posture of the distal-end-side link hub relative to the proximal-end-side link hub is at an origin position ($\theta=0$, $\varphi=0$), wherein

[Math 4]

$$\begin{pmatrix} \cos(\gamma/2)\cos\varepsilon 0 \\ \pm\sin\alpha\cos\beta n \\ \sin\alpha\sin\beta n \end{pmatrix} = $$

$$\begin{pmatrix} \cos(\phi-\delta n) & -\sin(\phi-\delta n) & 0 \\ \sin(\phi-\delta n) & \cos(\phi-\delta n) & 0 \\ 0 & 0 & 1 \end{pmatrix} \begin{pmatrix} \cos(\theta/2) & 0 & \sin(\theta/2) \\ 0 & 1 & 0 \\ -\sin(\theta/2) & 0 & \cos(\theta/2) \end{pmatrix}$$

$$\begin{pmatrix} \cos(\phi-\delta n) & \sin(\phi-\delta n) & 0 \\ -\sin(\phi-\delta n) & \cos(\phi-\delta n) & 0 \\ 0 & 0 & 1 \end{pmatrix} \begin{pmatrix} \cos(\gamma/2)\cos\varepsilon n \\ \cos(\gamma/2)\sin\varepsilon n \\ \sin(\gamma/2) \end{pmatrix}$$

equation 1

$$\frac{\gamma}{2} = \sin^{-1}\left(\frac{D}{2\sqrt{La^2+Lb^2}}\right) - \tan^{-1}\left(\frac{Lb}{La}\right)$$

equation 2

$$\varepsilon_0 = \pm\sin^{-1}\left(\sqrt{\frac{\sin^2\alpha - \sin^2(\gamma/2)}{\cos^2(\gamma/2)}}\right).$$

equation 3

2. The link actuation device as claimed in claim 1, wherein the control unit is configured:

to calculate the distance D between the center of the proximal-end-side spherical link and the center of the distal-end-side spherical link when a rotation radius R is at a target value, using equation 4 below:

$$D=2(R-Lc)\cos(\theta/2) \quad \text{equation 4,}$$

to calculate the rotation angle βn of the proximal-side end link member from the targeted posture (θ, φ) of the distal-end-side link hub and the rotation radius R, and to control the respective actuators so as to attain the calculated rotation angle βn, where the rotation radius from a rotation center that is an intersection of the fifth central axis of the proximal-end-side link hub and the seventh central axis of the distal-end-side link hub to a work point that is located at a fixed position relative to the distal-end-side link hub is defined as R, and a distance from the center of the distal-end-side spherical link to the work point is defined as Lc.

3. The link actuation device as claimed in claim 2, wherein the control unit is configured:

to calculate the posture (θ, φ) of the distal-end-side link hub and the distance D such that the rotation radius R of the work point remains constant, and to control the respective actuators so as to attain the calculated rotation angle βn.

4. The link actuation device as claimed in claim 1, wherein the link actuation device has a retreating function for reducing the distance between the center of the proximal-end-side spherical link and the center of the distal-end-side spherical link to avoid contact with a peripheral object.

5. The link actuation device as claimed in claim 1, wherein the link actuation device has a function for reducing the distance between the center of the proximal-end-side spherical link and the center of the distal-end-side spherical link when the link actuation device is not in use.

6. A link actuation device, comprising:
a proximal-end-side link hub;
a distal-end-side link hub;
three or more link mechanisms each coupling the distal-end-side link hub to the proximal-end-side link hub such that a posture of the distal-end-side link hub is changeable relative to the proximal-end-side link hub, wherein each of the three or more link mechanisms includes:
a proximal-side end link member having one end rotatably coupled to the proximal-end-side link hub,
a distal-side end link member having one end rotatably coupled to the distal-end-side link hub,
a proximal-side intermediate link member having one end rotatably coupled to another end of the proximal-side end link member, and
a distal-side intermediate link member having one end rotatably coupled to another end of the distal-side end link member, and another end rotatably coupled to another end of the proximal-side intermediate link member,
wherein
a first central axis of a first revolute pair of the proximal-side end link member and the proximal-side intermediate link member intersects with a second central axis of a second revolute pair of the distal-side end link member and the distal-side intermediate link member at a single point,
the another end of the proximal-side intermediate link member and the another end of the distal-side intermediate link member are rotatably coupled to each other at a rotation axis of the proximal-side intermediate link member and the distal-side intermediate link member that is a third central axis of a third revolute pair of the proximal-side intermediate link member and the distal-side intermediate link member so that an angle formed by the first and second central axes of the first and second revolute pairs is changeable, for each of the link mechanisms, a geometric model that represents the link mechanism with straight lines has such a shape that a proximal side part and a distal side part are symmetrical to each other with respect to the rotation axis of the proximal-side intermediate link member and the distal-side intermediate link member;

actuators, provided to three or more link mechanisms among the three or more link mechanisms, configured to change a posture and a distance from the distal-end-side link hub to the proximal-end-side link hub;

a control unit configured to control the actuators;
a posture calculator,
wherein in the proximal side part, a point at which a fourth central axis of a fourth revolute pair of the proximal-end-side link hub and the proximal-end-side link member intersects with the first central axis of the first revolute pair is referred to as a center of a proximal-end-side spherical link, and a line that passes through the center of the proximal-end-side spherical link and orthogonally intersects with the fourth central axis is referred to as a fifth central axis of the proximal-end-side link hub, in the distal side part, a point at which a sixth central axis of a fifth revolute pair of the distal-end-side link hub and the distal-side end link member intersects with the second central axis of the second revolute pair is referred to as a center of a distal-end-side spherical link, and a line that passes through the center of the distal-end-side spherical link and orthogonally intersects with the sixth central axis is referred to as a seventh central axis of the distal-end-side link hub, the posture calculator is configured to calculate a current posture (θ, φ) of the distal-end-side link hub relative to the proximal-end-side link hub and a current distance D between the center of the proximal-end-side spherical link and the center of the distal-end-side spherical link from a rotation angle βn of the proximal-side end link member, by converting equation 1 among equations 1, 2, and 3 below, the proximal side part includes:
an axial angle α formed by the first central axis of the first revolute pair and the fourth central axis of the fourth revolute pair,
a distance La from a first projection line obtained by vertically projecting the rotation axis of the proximal-side intermediate link member and the distal-side intermediate link member onto a plane including the first central axis of the first revolute pair and the fourth central axis of the fourth revolute pair, to the center of the proximal-end-side spherical link, and
a distance Lb from the first projection line to the rotation axis of the proximal-side intermediate link member and the distal-side intermediate link member, the distal side part includes:
the axial angle α formed by the second central axis of the second revolute pair and the sixth central axis of the fifth revolute pair,
the distance La from a second projection line obtained by vertically projecting the rotation axis of the proximal-side intermediate link member and the distal-side intermediate link member onto a plane including the second central axis of the second revolute pair and the sixth central axis of the fifth revolute pair, to the center of the distal-end-side spherical link, and the distance Lb from the second projection line to the rotation axis of the proximal-side intermediate link member and the distal-side intermediate link member, the proximal-side end link member has the rotation angle βn (n=1, 2, 3, . . . ) relative to the proximal-end-side link hub;

the seventh central axis of the distal-end-side link hub is inclined at a vertical angle θ relative to the fifth central axis of the proximal-end-side link hub;

the seventh central axis of the distal-end-side link hub is inclined at a horizontal angle φ relative to the fifth central axis of the proximal-end-side link hub;

the center of the proximal-end-side spherical link has the distance D from the center of the distal-end-side spherical link;

the first central axis of the first revolute pair forms an angle γ relative to the second central axis of the second revolute pair;

respective proximal-side end link members among the three or more link mechanisms are separated from each other at a separation angle δn (n=1, 2, 3, . . . ) in a circumferential direction with respect to a proximal-side end link member of the respective proximal-side end link members which serves as a reference;

each first projection line on a respective proximal side part among the three or more link mechanism is separated from each other at a separation angle εn (n=1, 2, 3, . . . ) in the circumferential direction with respect to a reference phase on a circumference through which the first projection lines pass;

a first projection line on one of the proximal side parts that serves as a reference has a separation angle ε0 in a state where the posture of the distal-end-side link hub relative to the proximal-end-side link hub is at an origin position (θ=0, φ=0), wherein

[Math 5]

$$\begin{pmatrix} \cos(\gamma/2)\cos\varepsilon 0 \\ \pm\sin\alpha\cos\beta n \\ \sin\alpha\sin\beta n \end{pmatrix} = \qquad \text{equation 1}$$

$$\begin{pmatrix} \cos(\phi-\delta n) & -\sin(\phi-\delta n) & 0 \\ \sin(\phi-\delta n) & \cos(\phi-\delta n) & 0 \\ 0 & 0 & 1 \end{pmatrix} \begin{pmatrix} \cos(\theta/2) & 0 & \sin(\theta/2) \\ 0 & 1 & 0 \\ -\sin(\theta/2) & 0 & \cos(\theta/2) \end{pmatrix}$$

$$\begin{pmatrix} \cos(\phi-\delta n) & \sin(\phi-\delta n) & 0 \\ -\sin(\phi-\delta n) & \cos(\phi-\delta n) & 0 \\ 0 & 0 & 1 \end{pmatrix} \begin{pmatrix} \cos(\gamma/2)\cos\varepsilon n \\ \cos(\gamma/2)\sin\varepsilon n \\ \sin(\gamma/2) \end{pmatrix}$$

$$\frac{\gamma}{2} = \sin^{-1}\left(\frac{D}{2\sqrt{La^2+Lb^2}}\right) - \tan^{-1}\left(\frac{Lb}{La}\right) \qquad \text{equation 2}$$

$$\varepsilon_0 = \pm\sin^{-1}\left(\sqrt{\frac{\sin^2\alpha - \sin^2(\gamma/2)}{\cos^2(\gamma/2)}}\right). \qquad \text{equation 3}$$

* * * * *

UNITED STATES PATENT AND TRADEMARK OFFICE
CERTIFICATE OF CORRECTION

PATENT NO. : 11,298,814 B2
APPLICATION NO. : 16/814144
DATED : April 12, 2022
INVENTOR(S) : Hiroshi Isobe et al.

It is certified that error appears in the above-identified patent and that said Letters Patent is hereby corrected as shown below:

In the Specification

Column 1, Line 10, delete "0 111(a)" and insert --§ 111(a)--.

In the Claims

Column 20, Line 44, Claim 1, below "wherein" delete "[Math 4]".

Column 21, Line 4, Claim 2, delete "D=2(R-Lc) cos ($\theta$/2)" and insert --D=2(R-Lc)cos($\theta$/2)--.

Column 24, Line 12, Claim 6, below "wherein" delete "[Math 5]".

Signed and Sealed this
Twenty-fourth Day of May, 2022

*Katherine Kelly Vidal*

Katherine Kelly Vidal
*Director of the United States Patent and Trademark Office*